(12) United States Patent
Mori et al.

(10) Patent No.: US 7,341,274 B2
(45) Date of Patent: Mar. 11, 2008

(54) PEDESTRIAN AIRBAG SYSTEM

(75) Inventors: Kenji Mori, Aichi-ken (JP); Atsushi Nagata, Aichi-ken (JP); Yuji Sato, Aichi-ken (JP); Yoshio Mizuno, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 288 days.

(21) Appl. No.: 11/079,470

(22) Filed: Mar. 15, 2005

(65) Prior Publication Data

US 2005/0206139 A1   Sep. 22, 2005

(30) Foreign Application Priority Data

| Mar. 17, 2004 | (JP) | ............................ 2004-076279 |
| May 31, 2004 | (JP) | ............................ 2004-161836 |
| May 31, 2004 | (JP) | ............................ 2004-161887 |

(51) Int. Cl.
   *B60R 21/34* (2006.01)
(52) U.S. Cl. .................................... 280/728.2; 180/274
(58) Field of Classification Search ............ 280/728.1, 280/748; 180/274; B60R 21/34
   See application file for complete search history.

(56) References Cited

U.S. PATENT DOCUMENTS

| 5,082,310 | A | * | 1/1992 | Bauer ........................ 280/732 |
| 5,997,030 | A | * | 12/1999 | Hannert et al. ........... 280/728.3 |
| 6,857,495 | B2 | * | 2/2005 | Sawa ......................... 180/274 |
| 6,920,954 | B2 | * | 7/2005 | Hashimoto et al. ......... 180/274 |
| 2004/0074688 | A1 | * | 4/2004 | Hashimoto et al. ......... 180/271 |
| 2004/0262894 | A1 | * | 12/2004 | Kempf ..................... 280/730.1 |

FOREIGN PATENT DOCUMENTS

| EP | 1 291 250 A1 | 3/2003 |
| EP | 1 300 302 A2 | 4/2003 |
| JP | 2003 104144 | 4/2003 |
| JP | A-2003-306101 | 10/2003 |
| JP | A-2004-90795 | 3/2004 |

OTHER PUBLICATIONS

Office Action issued by the German Patent Office in connection with counterpart German patent application No. 10 2005 012 136.5 dated Jun. 2006.
Office Action issued by the Chinese Patent Office in connection with counterpart Chinese patent application No. 10 2005 1005 5536.4 dated Jun. 2006.

* cited by examiner

*Primary Examiner*—Paul N. Dickson
*Assistant Examiner*—Leonard McCreary, Jr.
(74) *Attorney, Agent, or Firm*—Posz Law Group, PLC

(57) ABSTRACT

A pedestrian airbag system is mounted to a rear portion of a vehicle's sheet metal hood panel. An airbag is inflated to cover an area from the rear portion of the hood panel to a front side of a front pillar by being supplied with inflation gas; a case accommodates the airbag, and an airbag cover formed of synthetic resin covers the upper side of the folded airbag to allow projection of the airbag when inflated. The air bag cover is disposed at the hood panel's rear portion so the airbag cover's upper surface is continuous with the upper surface of the hood panel, elongated in the width direction of the hood panel, and mounted to the hood panel to be capable of moving in the width direction of the hood panel. Deterioration of the airbag cover's appearance due to thermal expansion can be prevented.

4 Claims, 29 Drawing Sheets

Fig. 23
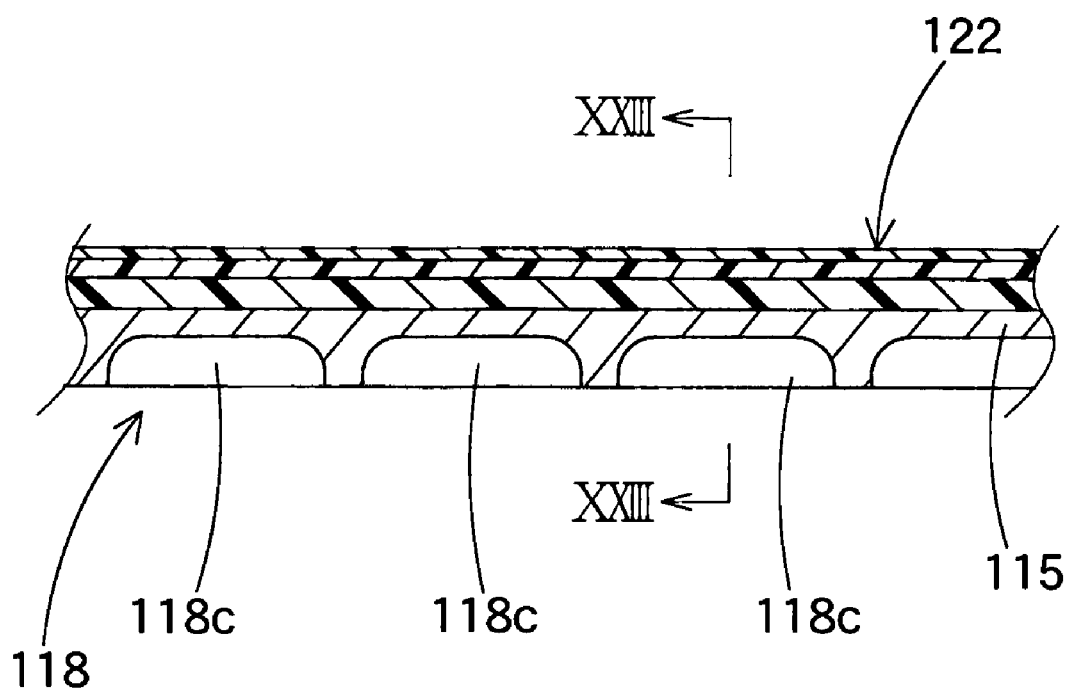
Sectional View taken along line XXIII-XXIII
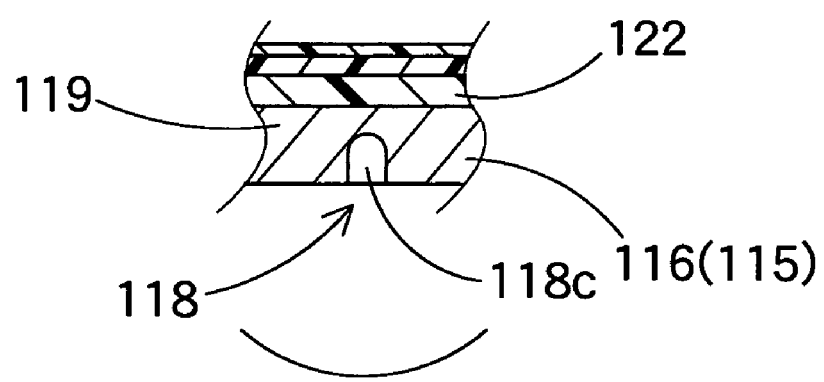

PEDESTRIAN AIRBAG SYSTEM

This present application claims priority from Japanese Patent Application No. 2004-76279 of Mori et al., filed on Mar. 17, 2004, Japanese Patent Application No. 2004-161836 of Nagata et al., filed on May 31, 2004, and Japanese Patent Application No. 2004-161887 of Nagata et al., filed on May 31, 2004, the disclosures of which are hereby incorporated into the present application by reference.

BACKGROUND OF THE INVENTION

1. Field of the Invention

The present invention relates to a pedestrian airbag system to be mounted to a hood panel of a vehicle formed of sheet metal at a position near the rear edge thereof. More specifically, the present invention relates to a pedestrian airbag system including an airbag which is inflated so as to cover at least the upper portion of a cowl near the rear edge of the hood panel by being supplied with inflation gas.

2. Description of the Related Art

In the related art, a pedestrian airbag system includes an airbag disposed near the rear end of the hood panel of a vehicle and stored in a case in a folded state. The case is integrally formed with an airbag cover which covers the upper side of the folded airbag, and is formed of synthetic resin (for example, see JP-A-2003-306101).

However, in the pedestrian airbag system in the related art, the case integrated with the airbag cover is firmly secured to a hood panel formed of sheet metal via a bolt or the like.

The synthetic resin case has a larger coefficient of thermal expansion than the hood panel formed of sheet metal approximately by one order of magnitude. Therefore, when the atmospheric temperature is high, the airbag cover portion of the case is significantly deformed with respect to the hood panel by thermal expansion. Consequently, the airbag cover portion of the case causes deterioration of appearance of the airbag system. In particular, a heat source such as an engine is disposed below the hood panel. Therefore, such deformation due to thermal expansion is conspicuously visible.

In the pedestrian airbag system in the related art, there is a type in which an opening allowing the airbag to project is formed on an outer panel of the hood panel, and the opening is covered by a flap portion. The flap portion is formed of sheet metal which is the same as the outer panel (for example, see JP-A-2004-90795).

In such a pedestrian airbag system, the flap portion which opens at the time of deployment and inflation of the airbag is not formed of synthetic resin. Therefore, there is no break due to the difference of material between the flap portion and the outer panel of the hood formed of sheet metal and disposed around the flap portion. Consequently, better design of the portion where the airbag system is mounted is achieved. However, even in the case of the pedestrian airbag system having the flap portion formed of sheet metal, a break showing the contour of the flap portion itself is still visible. Therefore, the pedestrian airbag system described above still needs improvement in design around the mounting position.

SUMMARY OF THE INVENTION

The first object of the present invention is to solve the above-described problem, providing a pedestrian airbag system which can prevent deterioration of the appearance of the airbag cover formed of synthetic resin due to thermal expansion.

The second and third objects of the invention are to solve the above-described problem, providing a pedestrian airbag system including a flap portion which opens when the airbag projects and which is formed of the same metal as the outer panel of the hood panel surrounding therearound so that design of the portion around the mounting position can be improved.

A first aspect of the invention is a pedestrian airbag system to be mounted to the rear portion of the hood panel of a vehicle formed of sheet metal. This pedestrian airbag system includes an airbag, a case, and an airbag cover. The airbag is inflated so as to cover at least the upper surface of the rear portion of the hood panel by being supplied with inflation gas. The case accommodates the folded airbag. The airbag cover, being formed of synthetic resin, covers the upper side of the folded airbag so as to be capable of opening to allow the airbag to project when being inflated. Furthermore, the airbag cover is disposed above the rear portion of the hood panel so that the upper surface of the airbag cover is continuous with the upper surface of the hood panel at the front edge of the airbag cover, and to be elongated in the direction of the width of the hood panel. Furthermore, the airbag cover is mounted to the hood panel so as to be capable of moving in the direction of the width of the hood panel.

In the pedestrian airbag system according to the first aspect of the invention, the airbag cover of synthetic resin is mounted to the hood panel so as to be capable of moving in the direction of the width of the hood panel formed of sheet metal. Therefore, even when it is expanded by heat to a degree larger than the hood panel, the airbag cover can move in the direction of the width of the hood panel without interfering with the hood panel. Consequently, even when the airbag cover is disposed on the rear portion of the hood panel widely elongated in the direction of the width of the hood panel, deterioration in appearance due to heat can be prevented.

The airbag cover is disposed so that the upper surface of the airbag cover is continuous with the upper surface of the hood panel on the front side. Therefore, the airbag cover can generate a sense of unity with the hood panel, whereby the appearance of the airbag system is improved.

Therefore, according to the pedestrian airbag system according to the first aspect of the invention, deformation of the airbag cover disposed widely on the rear portion of the hood panel due to thermal expansion can be prevented, whereby deterioration of appearance of the airbag cover is prevented.

In the pedestrian airbag system according to the first aspect of the invention, the airbag cover is disposed across the entire width of the hood panel. In this arrangement, there exists no break with respect to the hood panel on the airbag cover at the lateral ends of the hood panel. Therefore, the appearance of the hood panel near the airbag cover on the side of the upper surface thereof is improved.

In the pedestrian airbag system according to the first aspect of the invention, the airbag cover includes a case covering portion and a general positioning portion. The case covering portion includes a flap portion which is pushed and opened by the airbag being inflated, and covers the upper side of the case. Then, the case covering portion is disposed on the front side of the airbag cover at a position apart from the rear end of the hood panel. The general positioning portion is disposed at least on the side of the rear edge of the hood panel.

In this arrangement, the case accommodating the folded airbag can be disposed near the front edge of the rear portion of the hood panel, that is, near the midsection of the hood panel in the longitudinal direction, and the airbag cover can be disposed so that the case is covered by the case cover. Even with this arrangement, the airbag cover covers a long distance, from above the case to the rear end of the hood panel along the longitudinal direction. Therefore, the airbag system can be mounted to the hood panel only with one boundary line with the airbag cover in the longitudinal direction, that is, one break in the longitudinal direction on the upper surface of the hood panel. Consequently, in the arrangement described above, even when the airbag cover of synthetic resin is provided on the rear end portion of the hood panel, design of the side of the upper surface of the hood panel can be improved.

In this case, the general positioning portion on the rear end portion of the hood panel is preferably such that the airbag cover is capable of moving also in the longitudinal direction of the hood panel. In this arrangement, even when expansion in the longitudinal direction occurs in the entire airbag cover, which is also elongated in the longitudinal direction due to heat, the airbag cover can be deformed so as to expand toward the rear without interfering with the hood panel. Consequently, the airbag cover is prevented from deteriorating in appearance.

In the pedestrian airbag system according to the first aspect of the invention, when the airbag cover includes a case covering portion having a flap portion which is pushed and opened by the airbag being inflated and covering the upper side of the case, the case covering portion may be disposed at the rear end of the hood panel so as to extend substantially over the entire area of the airbag cover in the longitudinal direction. In this arrangement, the airbag cover can be reduced in length in the longitudinal direction and mounted in the rear portion of the hood panel. Then, in this arrangement, even when the airbag cover is expanded in the longitudinal direction due to heat, the airbag cover is still disposed by the rear edge of the hood panel. Consequently, in this arrangement, the airbag cover can expand toward the rear side, whereby deterioration of the appearance can be prevented.

When the hood panel includes an outer panel on the upper surface, and an inner panel at the lower surface which is greater in strength than the outer panel, the case is connected with the inner panel or integrated with the inner panel. Preferably, at least the front edge of the airbag cover is attached to the outer panel.

In this arrangement, since the case of the airbag system is connected or integrated to the high strength inner panel of the hood panel, the airbag system can be mounted stably to the hood panel. At least the front edge of the airbag cover is attached to the outer panel on the side of the upper surface of the hood panel. Therefore, in this arrangement, alignment between the front edge side of the airbag cover at the rear portion of the hood panel and the outer panel can be performed easily, whereby the appearance design of the airbag cover can be improved.

The pedestrian airbag system according to a second aspect of the invention is mounted to the hood panel of the vehicle formed of sheet metal. The pedestrian airbag system includes an airbag, an outer panel, a flap portion, and a coating film. The airbag is inflated so as to cover at least the upper side of a cowl near the rear edge of the hood panel by being supplied with inflation gas. The outer panel, being formed of sheet metal and constituting the upper surface of the hood, includes an opening to allow the airbag being inflated to project therethrough. The flap portion covers the opening of the hood panel so that it opens when pressed by the airbag at the time of inflation. The flap portion is formed of the same metal material as the outer panel disposed around the opening of the hood panel. The flap portion includes a separation line which can be separated from the outer panel and a hinge portion which serves as a center of rotation when the flap is opened, disposed at the boundary with respect to the outer panel. The coating film is coated on the outer surfaces of the outer panel and the flap portion continuously.

In the pedestrian airbag system according to the second aspect of the invention, the outer surfaces of the outer panel and the flap portion are coated continuously by the same coating film. Therefore, the break, which indicates the boundary between the flap portion and the outer panel disposed therearound is hardly visible. Consequently, design of the hood panel near the portion where the airbag system is mounted is improved.

The flap portion is formed of the same metal material as the outer panel therearound. Therefore, the flap portion has the same coefficient of expansion as the outer panel therearound and hence is not distorted even when being affected by heat or the like. Consequently the design of the hood panel does not deteriorate at the portion where the airbag system is mounted.

When the airbag is inflated, the flap separation line is separated from the outer panel at the boundary between them, opening about the hinge portion as the center of the rotation, thereby opening the airbag cover for projection of the airbag. Therefore, the airbag projects from the opening for projection without problem so as to be capable of protecting the pedestrian.

Therefore, in the pedestrian airbag system according to the second aspect of the invention, design of the mounting portion can be improved.

By disposing the separation line so that the outer surfaces of the flap portion and the panel therearound are aligned flush with each other, design of the mounting portion can further be improved.

The separation line may be formed so that the outer panel and the flap portion are separated from the beginning. In this case, the separation line can be formed by providing a slit between the flap portion and the outer panel. Alternatively, where the outer panel and the flap portion are separated from the beginning, the separation line can be formed by cutting the flap portion from the same sheet metal as the outer panel and disposing the flap portion so as to abut against the opening of the outer panel surrounding the flap portion. The separation line need not be formed so that the flap portion and the outer panel are separated in advance. In this case, the separation line can be formed by providing a continuous or discontinuous thinned portion between the flap portion and the outer panel so as to be broken when pressed by the airbag, causing separation.

When the separation line is formed so that the flap portion and the outer panel are separated from the beginning, a supporting strip for supporting the outer periphery of the flap portion is preferably provided on the side of the lower surface of the separation line. The supporting strip is formed by extending the outer panel at the peripheral edge of the opening around the flap portion. Alternatively, the supporting strip may be formed by securing a separate member. In this arrangement, downward dropping of the flap portion can be prevented by the supporting strip.

The hinge portion may be formed integrally with the outer panel so as to be bent and deformed when opening the flap portion. Alternatively, a bendable and deformable, or rotatable hinge portion is joined to the outer panel and the flap portion so as to straddle therebetween.

The pedestrian airbag system according to the second aspect of the invention can be mounted to any portion of the outer panel as long as it is exposed to the outside of the vehicle. Therefore, the pedestrian airbag system according to the second aspect of the invention can be mounted not only to a portion of the hood panel, but also the door portion, the front fender portion, the roof portion, and so on.

In the pedestrian airbag system according to the second aspect of the invention, when the case for accommodating the folded airbag is disposed on the rear surface side of the flap portion, the case and the portion of the outer panel near the separation line are preferably connected to each other.

In this arrangement, the case has rigidity so as not to be deformed even when it is subjected to the reaction force of the projecting airbag. Further, the portion of the outer panel near the separation line is connected to the case. Therefore, when the airbag is deployed and inflated, the peripheral edge of the opening on the side of the outer panel can be prevented from being deformed, so that the pressing force of the airbag can be concentrated on the flap portion. Consequently, in this arrangement, the flap portion can be opened quickly, and hence quick deployment and inflation of the airbag can be promoted. In particular, the arrangement as described above in which the case and the portion of the outer panel near the separation line are connected is preferable for the separation line portion of breakaway type. This is a type in which the boundary portion between the outer panel and the flap portion is broken when pressed by the airbag so as bring the flap portion into the opened state, and in the above described arrangement, the separation line can be broken smoothly.

The pedestrian airbag system according to a third aspect of the invention is mounted to the portion near the rear edge of the hood panel of the vehicle formed of sheet metal. This pedestrian airbag system includes the airbag, the case, and the flap portion. The airbag is disposed near the rear edge of the hood panel. The airbag is accommodated in a folded state so as to be capable of being deployed and inflated toward the upper rear, covering at least the cowl near the rear edge of the hood panel, by being supplied with inflation gas. The case opens on the upper side and accommodates the airbag. The flap portion is disposed at the rear portion of the hood panel, and is formed integrally with the hood panel. The flap portion covers the upper side of the case. The flap portion includes a hinge portion which is plastically deformed when opening, on the edge of the flap portion toward the front. When the airbag is deployed and inflated, the flap portion is pushed by the airbag so that the hinge portion is plastically deformed and the rear edge side opens upward. Then, the flap portion causes the airbag to project from the opening formed at a position apart from the upper end side of the case.

In the pedestrian airbag system according to the third aspect of the invention, the flap portion which covers the upper side of the case is integrally formed with other portions of the hood panel via the hinged portion which is plastically deformable. Therefore, no break between the flap portion and the hood panel therearound appears on the side of the outer surface of the hood panel. Consequently, the hood panel design at the portion where the pedestrian airbag system is mounted is improved.

In the pedestrian airbag system according to the third aspect of the invention, the flap portion opens so that the rear edge side opens upward when the airbag is deployed and inflated, and the airbag projects from the opening formed when the rear edge of the cover separates from the upper end of the case. Consequently, the airbag can be deployed and inflated so as to be capable of protecting the pedestrian without problem.

Therefore, in the pedestrian airbag according to the third aspect of the invention, design of the mounting position near the rear portion of the hood panel can be improved.

In the pedestrian airbag system according to the third aspect of the invention, when the case includes a rear wall portion disposed on the rear side of the accommodated airbag, the case is preferably arranged as follows. The case is arranged in such a manner that when the airbag is deployed and inflated, the upper end side of the rear wall portion can be moved rearward so as to broaden the opening on top of the case by being pressed by the airbag.

When the pedestrian airbag system is configured in the arrangement as described above, when the airbag is deployed and inflated, the case opens so as to broaden the opening on top by moving the upper end side of the rear wall portion rearward. Therefore, in this arrangement, the broad opening for allowing the airbag to project can be secured. Consequently, in this arrangement, the airbag can be projected quickly from the opening for deployment and inflation.

When the rear wall portion is arranged to be capable of moving rearward, the case bottom is preferably supported by the cowl. This is because the cowl prevents such deformation of the case as to move downwardly when the airbag is deployed and inflated, whereby the case can stabilize the direction of projection of the airbag.

Furthermore, in the pedestrian airbag system according to the third aspect of the invention, the flap portion is preferably configured to open at an angle smaller than 90°.

When the pedestrian airbag system is configured in the arrangement described above, the rear edge of the opened flap portion does not move so as to face forward. Therefore, in this arrangement, the pedestrian can be protected from the rear edge of the flap portion.

The structure which limits the opening angle of the flap portion as described above can be configured by disposing portions which are integrally connected to the hood panel at both left and right edges of the flap portion and are plastically deformed so as to limit the opening angle. Alternatively, it can be configured by disposing stoppers including guide strips and engaging shanks on the left and right sides of the case so as to be capable of limiting the opening angle of the flap portion. The guide strips extend downwardly from the flap portion and include substantially arcuate grooves. The engaging shanks are projected so as to be inserted from the case into the grooves. Then, the engaging shanks abut against the distal ends of the grooves on the guide strips when opening of the flap is completed, so that the opening angle of the flap portion is limited.

Furthermore, in the pedestrian airbag system according to the third aspect of the invention, the hinge portion is preferably disposed at a position forwardly of the opening of the case.

When the pedestrian airbag system is configured in the arrangement as described above, the hinge portion, which serves as the center of rotation when the flap portion is opened, is disposed at a position forwardly of the opening of the case. In other words, the distance from the hinge portion to the rear edge of the flap portion is set to a larger value than the case where the hinge portion is disposed at a position near the front edge of the case opening. Therefore, even when the opening angle of the flap portion is small, a sufficient size of opening between the rear edge and the case can be secured. Consequently, the opening angle of the flap portion can be minimized, and hence the pedestrian can be protected reliably from the rear edge of the flap portion.

In the pedestrian airbag system according to the third aspect of the invention, the case is preferably fixed to the cowl downwardly of the hood panel.

When the pedestrian airbag system is configured in the arrangement as described above, the heavy case accommodating the airbag and the inflator for supplying inflation gas is not fixed to the hood panel side. Therefore, the weight of the hood panel is not increased, whereby the mounting operation of the hood panel to the vehicle body side is facilitated.

Furthermore, in the pedestrian airbag system according to the third aspect of the invention, the flap portion of the hood panel is preferably formed of aluminum including the portion of the hood panel adjacent to the front edge of the flap portion.

When the pedestrian airbag system is configured in the arrangement as described above, since aluminum is softer than metal material such as steel, the hinge portion can easily be deformed. Accordingly, the flap portion can easily be opened when the airbag is deployed and inflated.

BRIEF DESCRIPTION OF THE DRAWINGS

FIG. 23 is a partial cross-sectional view of a modification of the separation line according to the fifth embodiment shown in FIG. 16 taken along the separation line;

DESCRIPTION OF THE PREFERRED EMBODIMENTS

Figure 1:
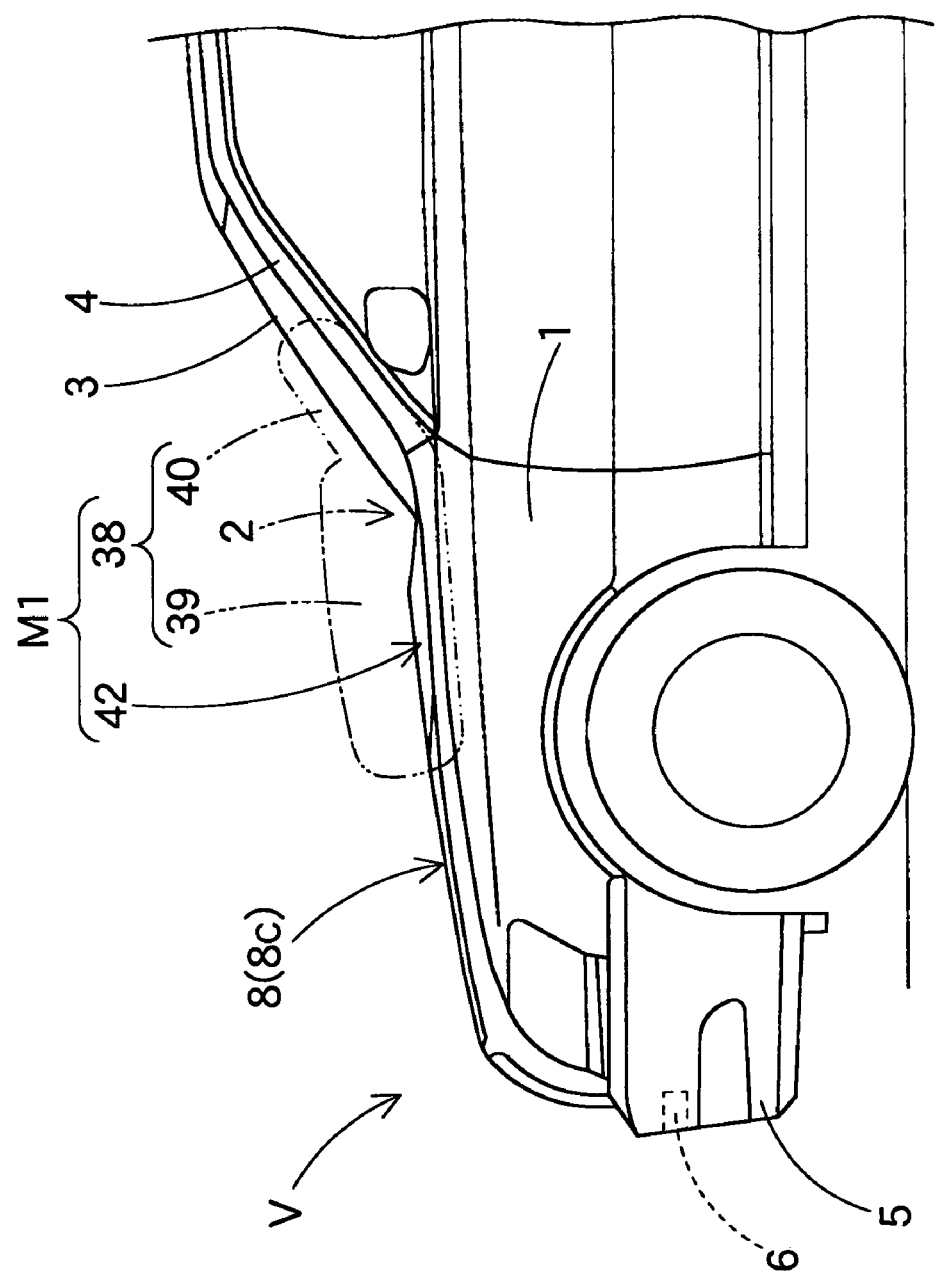
FIG. 1 is a side view of a vehicle on which a pedestrian airbag system according to a first embodiment of the invention is mounted.

Preferred embodiments of the present invention are described below with reference to accompanying drawings.

However, the invention is not limited to the embodiments disclosed herein. All modifications within the appended claims and equivalents relative thereto are intended to be encompassed in the scope of the claims.

A pedestrian airbag system M1 according to a first embodiment is mounted to a hood panel 8 of a vehicle V, which is formed of sheet metal, on the side of a rear portion 8a as shown in FIG. 1 to FIG. 5. The airbag system M1 includes an airbag 38, an inflator 33 for supplying inflation gas to the airbag 38, a case 26 for accommodating the folded airbag 38 and the inflator 33, and an airbag cover 42.

In this specification, directions of front, rear, upper, and lower are based on directions corresponding to the front, rear, upper, and lower sides of the vehicle V, and left and right directions are based on left and right when viewed from the front side of the vehicle V toward the rear.

The vehicle V is provided with a sensor 6 which can detect or predict collision with a pedestrian on a front bumper 5. When an airbag activating circuit, not shown, supplies a signal detecting the collision with the pedestrian from the sensor 6, the inflator 33 is activated, so that the airbag 38 is deployed and inflated.

Figure 2:
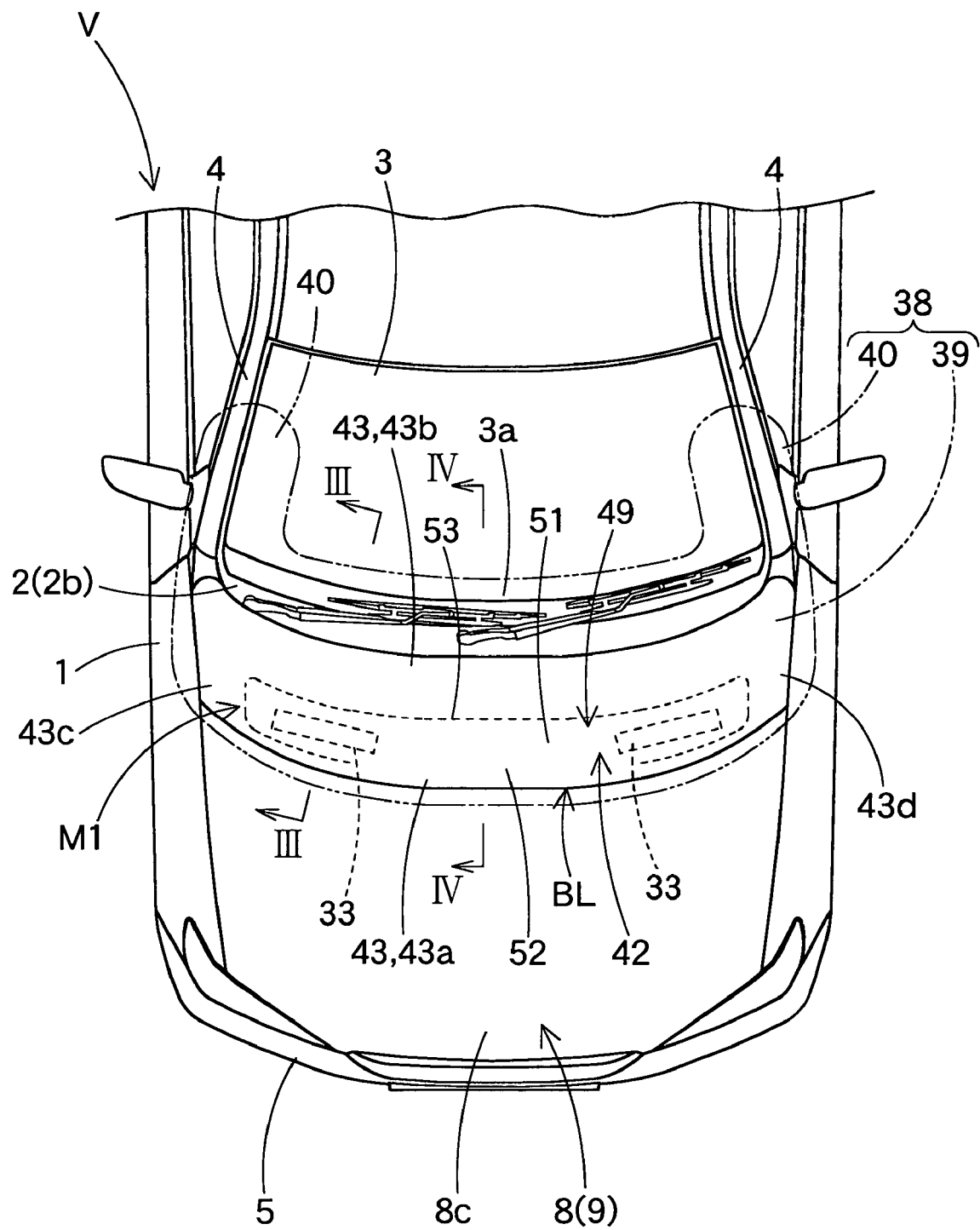
FIG. 2 is a plan view of a vehicle on which the pedestrian airbag system according to the first embodiment shown in FIG. 1 is mounted.

The hood panel 8, being formed of sheet metal, includes an outer panel 9 on the side of the upper surface and an inner panel 15 located on the side of the lower surface and having higher strength than the outer panel 9, as shown in FIG. 1 to 5. The hood panel 8 is of a front-opened type, in which both lateral edges near the rear end 8b, that is, the both left and right sides are connected to and supported by the body 1 of the vehicle V via hinge portions, not shown. The rear edge 8b of the hood panel 8 is covered by the airbag cover 42 on the upper side thereof. Then, the rear edge 8b extends substantially in parallel with the lower end 3a of a front wind shield 3 as shown in FIG. 2, and is curved so as to project forward at the widthwise center thereof.

The outer panel 9 is adapted to deflect more when the pedestrian collides with it than the inner panel 15. The outer panel 9 is provided with a stepped portion 10 which is stepped downward on the side of a rear portion 9a. The stepped portion 10 is provided with a placement hole 11 opening in a substantially rectangular shape for placing the airbag system M1. A front edge 10a of the stepped portion 10 and the placement hole 11 are curved in parallel with the rear edge 8b of the hood panel 8 so as to project forward at the portion near the lateral center thereof when viewed from above.

A front portion 12 on the side of the front edge of the peripheral edge of the placement hole 11 of the outer panel 9 is formed with projections and depressions in the lateral direction, that is, in the direction along the width of the hood panel 8. Then, at a plurality of projections 12a projecting rearwardly are formed laterally elongated guide holes 12b, and column shaped guide pins 45 of the airbag cover 42 are inserted into the guide holes 12b. A rear edge 12c between the projections 12a on the front portion 12 is engaged with engaging hooks 44 of the airbag cover 42 so as to be constrained from vertical movement.

Specifically, the shape along the lateral direction of the guide holes 12b or the rear edge 12c follows the front edge 10a of the stepped portion 10 in front of these portions to be arranged.

A rear edge portion 13 of the periphery of the placement hole 11 of the outer panel 9 is formed with circular guide holes 13a as shown in FIGS. 3-5, 9. A rear portion 15a of the inner panel 15 is also formed with circular guide holes 19a which are aligned with the guide holes 13a. A plurality of the guide holes 13a, 19a are arranged in the widthwise direction of a hood panel 3, that is, in the lateral direction, and cylindrical guide bosses 46 of the airbag cover 42 are inserted therethrough.

The inner panel 15 is also provided with a stepped portion 16 on the side of the rear portion 15a. The stepped portion 16 includes a placement hole 17 opening in a rectangular shape for placing the airbag system M1. The stepped portion 16 is formed with ribs 16b, which are of a U-shape in cross section for increasing rigidity thereof. A front edge 16a of the stepped portion 16 or the placement hole 17 are curved so as to project forward at the lateral center substantially in parallel with the rear edge 8b of the hood panel 8 when viewed from above in the same manner as the front edge 10a of the stepped portion 10 and the placement hole 11.

The front and rear peripheral areas of the placement hole 17 are provided with a mounting seat 18 for securing the case 26. The mounting seat 18 is formed with a plurality of mounting holes 18a penetrating therethrough. The mounting holes 18a are arranged along the direction of the width of the hood panel 8. Nuts 21b of joint devices 21 for firmly fixing the case 26 are fixed on the peripheral edges of the respective mounting holes 18a on the lower surface of the mounting seat 18. A plurality of guide holes 19a for receiving the guide bosses 46 of the air bag cover 42 inserted therein are disposed on the rear edge portion 19 on the rear side of the placement hole 17. These guide holes 19a are arranged along the direction of the width of the hood panel 8. These guide holes 19a are opened in circular shapes like the guide holes 13a on the outer panel 9.

The case 26, being formed of sheet metal, is substantially in a box-shape with a side wall portion 27 and a bottom wall portion 31 as shown in FIGS. 3 to 7. The side wall portion 27 is substantially a square tube aligned in the vertical direction and opened on the upper side. The bottom wall portion 31 closes the lower end of the side wall portion 27. The side wall portion 27 of the case 26 is curved so as to project forward at the laterally center thereof along the rear edge 8b of the hood panel 8 when viewed from above. The side wall portion 27 is surrounded by the inner peripheral areas of the placement holes 11, 17 extending vertically through the hood panel 8, on four sides: front, rear, left and right.

The upper edges of wall portions 27a, 27b which are the front and rear portions of the side wall portion 27 are provided respectively with fixing strips 28 and connecting strips 29 extending outward, that is, forward and rearward of the side wall portion 27. A plurality of the fixing strips 28 and the connecting strips 29 are provided alternately along the direction of the width of the hood panel 8.

The respective fixing strips 28 are portions for fixing the case 26 to the inner panel 15 of the hood panel 8. The respective fixing strips 28 project so as to cover the respective mounting holes 18a of the mounting seats 18 on the front and rear of the placement hole 17 of the inner panel 15. The respective fixing strips 28 are formed with mounting holes 28a corresponding to the mounting holes 18a so as to penetrate in the vertical direction. Bolts 21a of the joint devices 21 are inserted through the mounting holes 28a. The bolts 21a pass through the mounting holes 28a, 18a and are screwed into the nuts 21b, whereby the case 26 is fixed to the inner panel 15. The joint device 21 comprises the bolt 21a and the nut 21b.

The respective connecting strips 29 are disposed so that a breakaway portion 53 around a flap portion 51 of the airbag cover 42 is broken smoothly when the airbag 38 is inflated. Therefore, the respective connecting strips 29 connect a connecting wall portion 50 of the airbag cover 42 to the case 26 so that the significant movement in the vertical direction is constrained. Each connecting strip 29 is formed into an inverted J-shape having a lateral plate portion 29a and an engaging plate portion 29b. The lateral plate portion 29a projects outward, that is, forwardly and rearwardly of the side wall portion 27. The engaging plate portion 29b is bent from the distal end of the lateral plate portion 29a downward.

The lateral plate portion 29a of the connecting strip 29B provided on the rear wall portion 27b of the case side wall portion 27 is longer in the longitudinal direction than the lateral plate portion 29a of the front connecting strip 29A.

The bottom wall 31 of the case 26 is disposed below the folded airbag. The bottom wall portion 31 is provided with through-holes 31a for inserting bolts 35 for mounting the inflators 33 to the case 26. The insertion holes 31a are formed near both sides of the bottom wall portion 31 since the inflators 33 are disposed on the both of the left and right sides of the hood panel 8.

Figure 3:
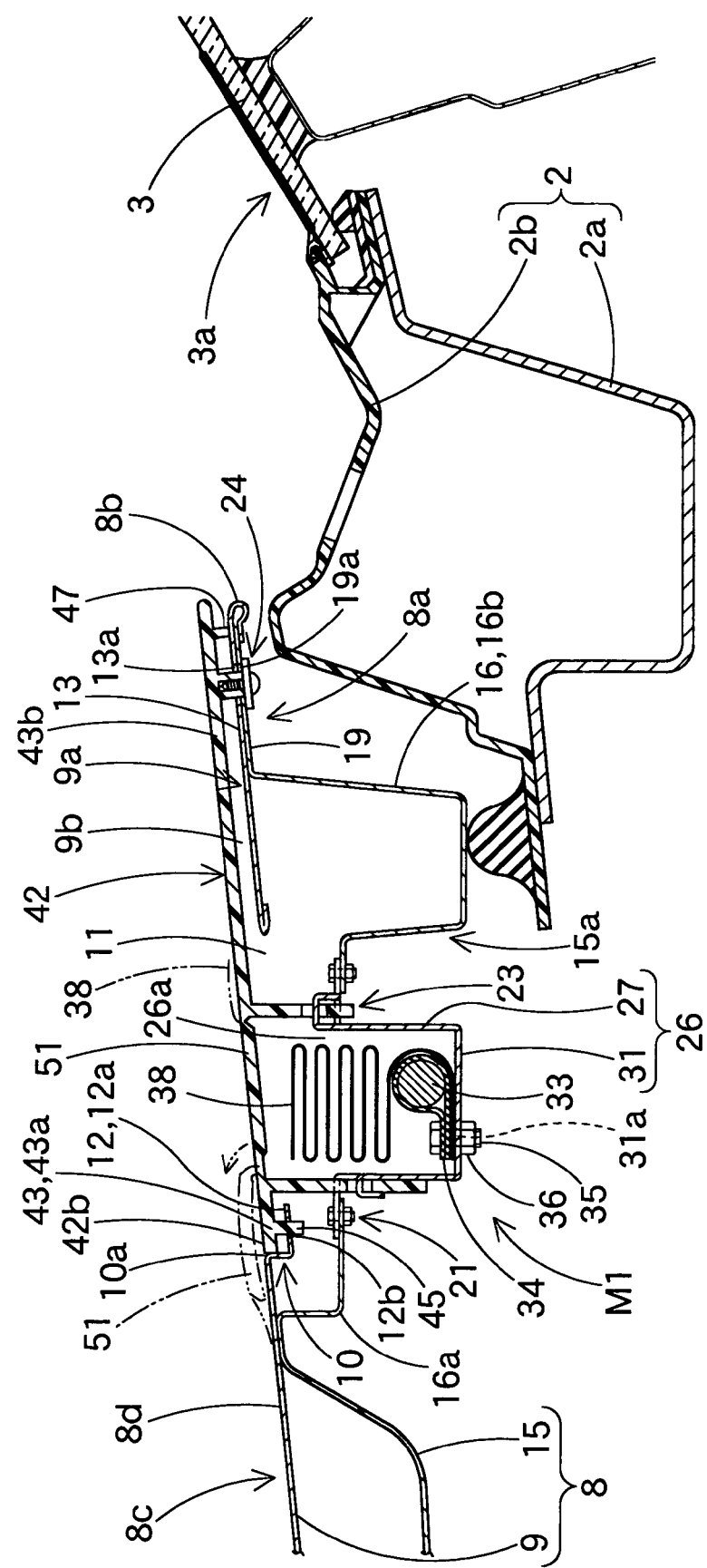
FIG. 3 is a schematic cross-sectional view of the pedestrian airbag system according to the first embodiment shown in FIG. 1 taken along the longitudinal direction of the vehicle.
Figure 4:
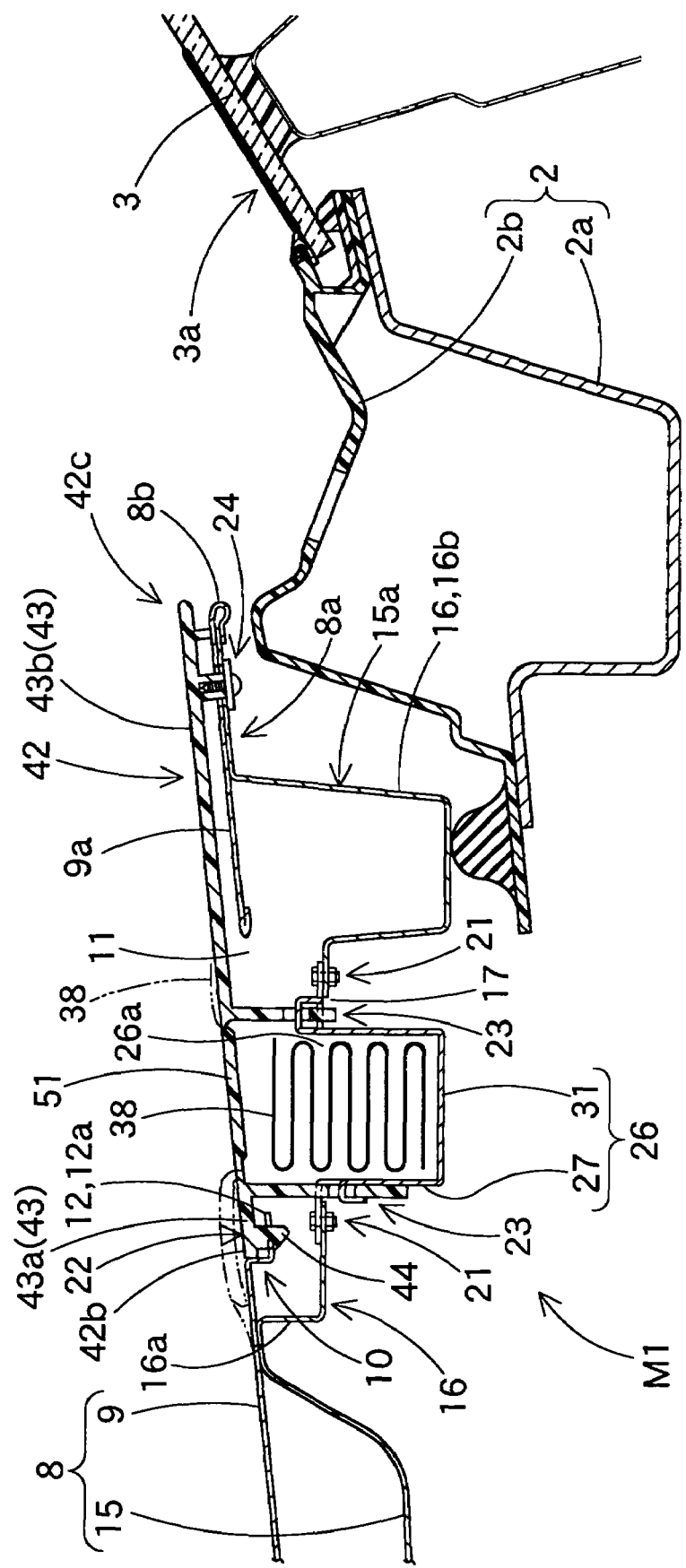
FIG. 4 is a schematic cross-sectional view of the pedestrian airbag system according to the first embodiment shown in FIG. 1 taken along the longitudinal direction of the vehicle, which corresponds to the portion taken along IV-IV in FIG. 2.
Figure 5:
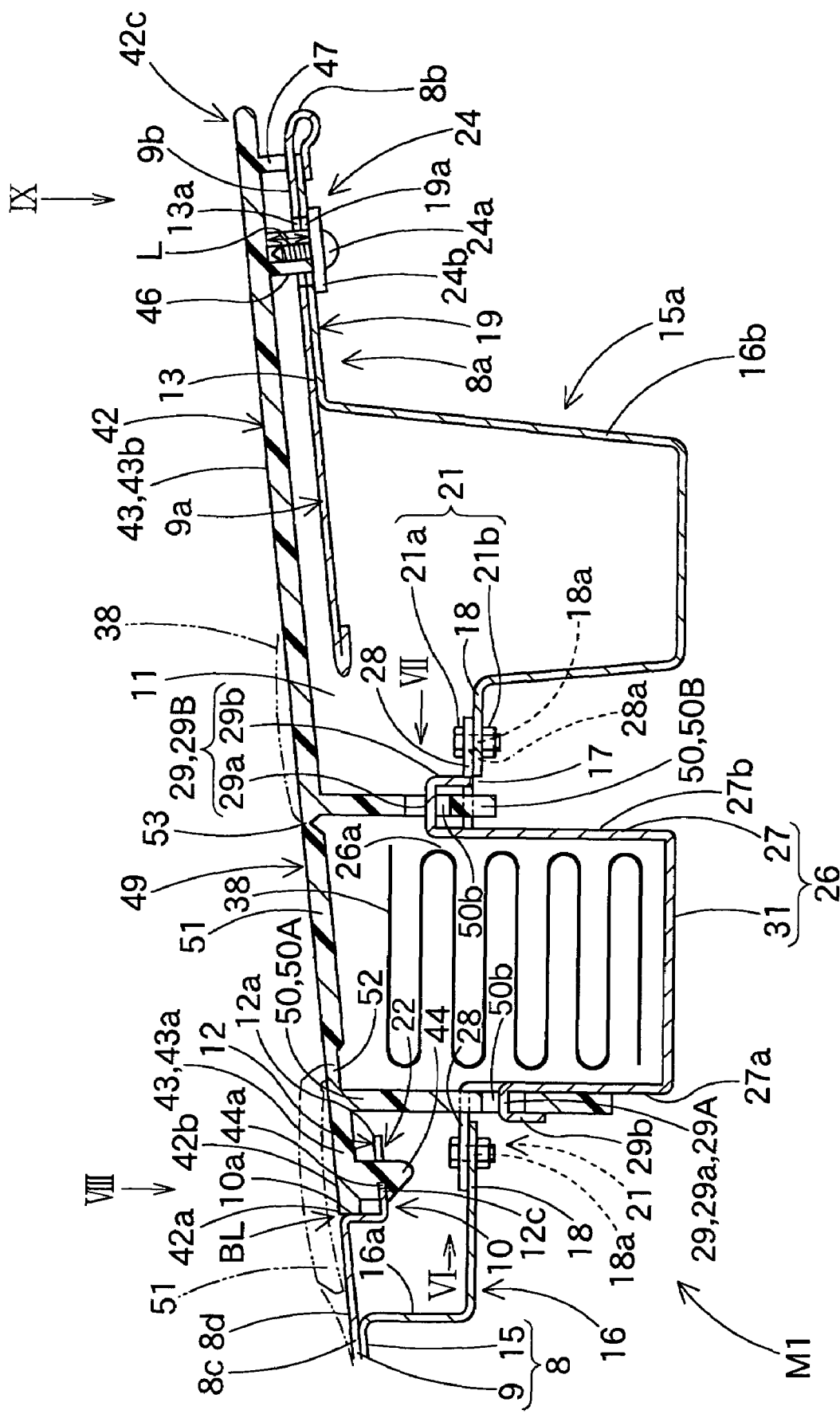
FIG. 5 is a partial enlarged view of FIG. 4.
Figure 6:
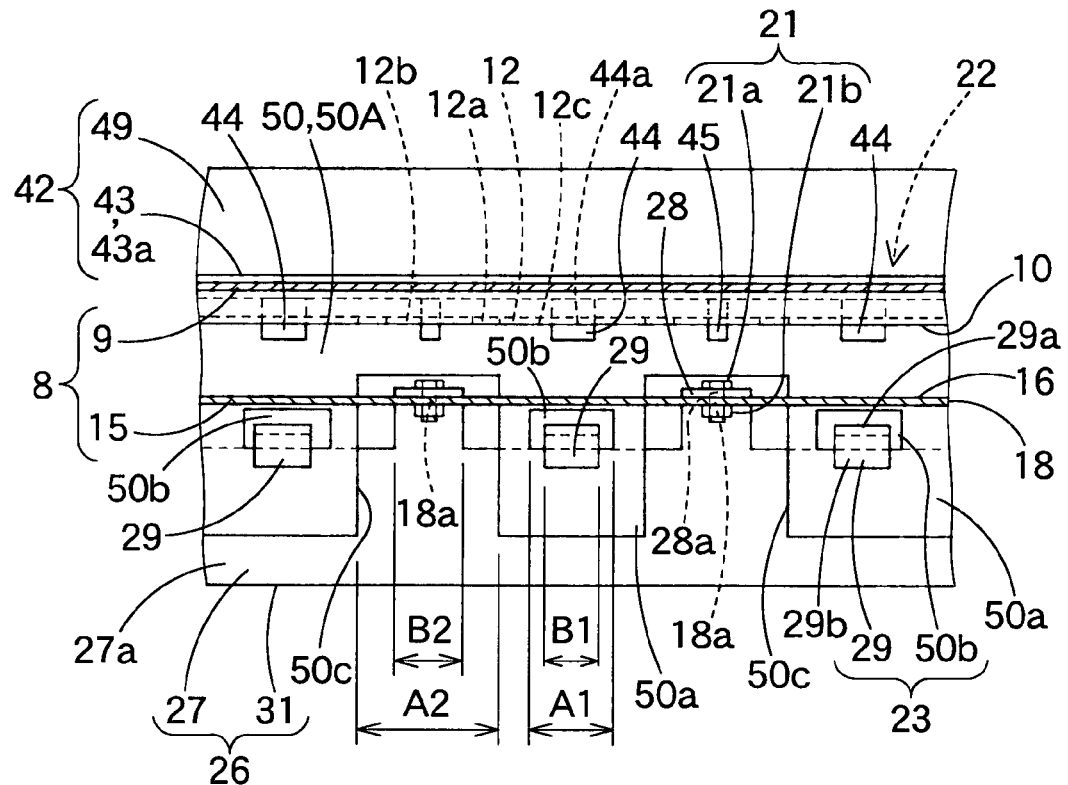
FIG. 6 is a schematic drawing when viewed from the direction VI in FIG. 5.
Figure 7:
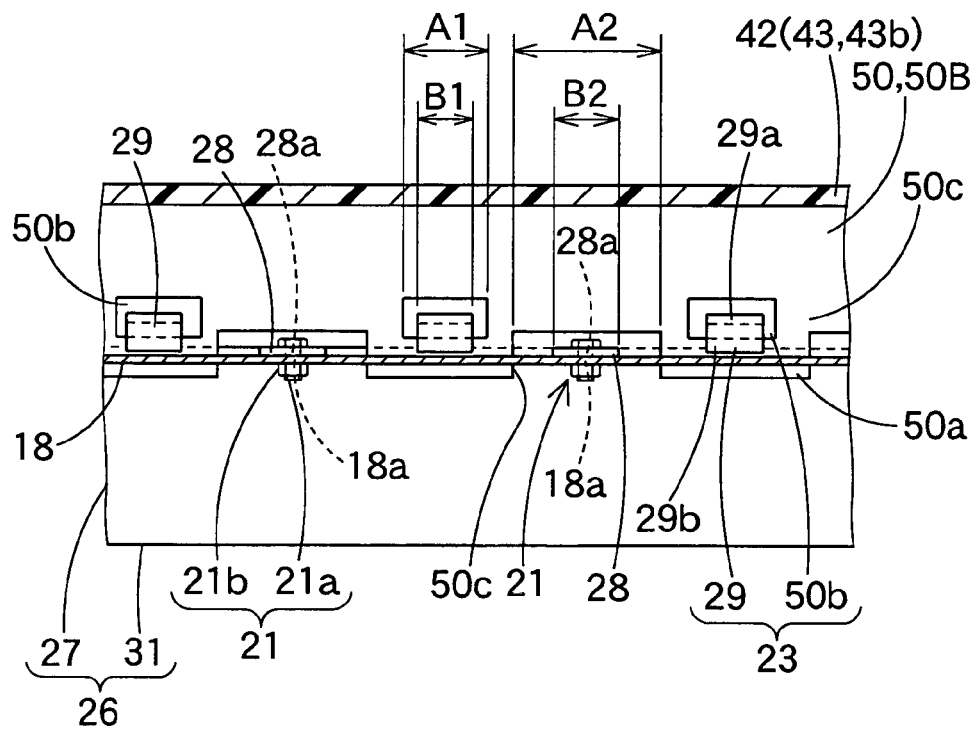
FIG. 7 is a schematic drawing when viewed from the direction VII in FIG. 5.
Figure 8:
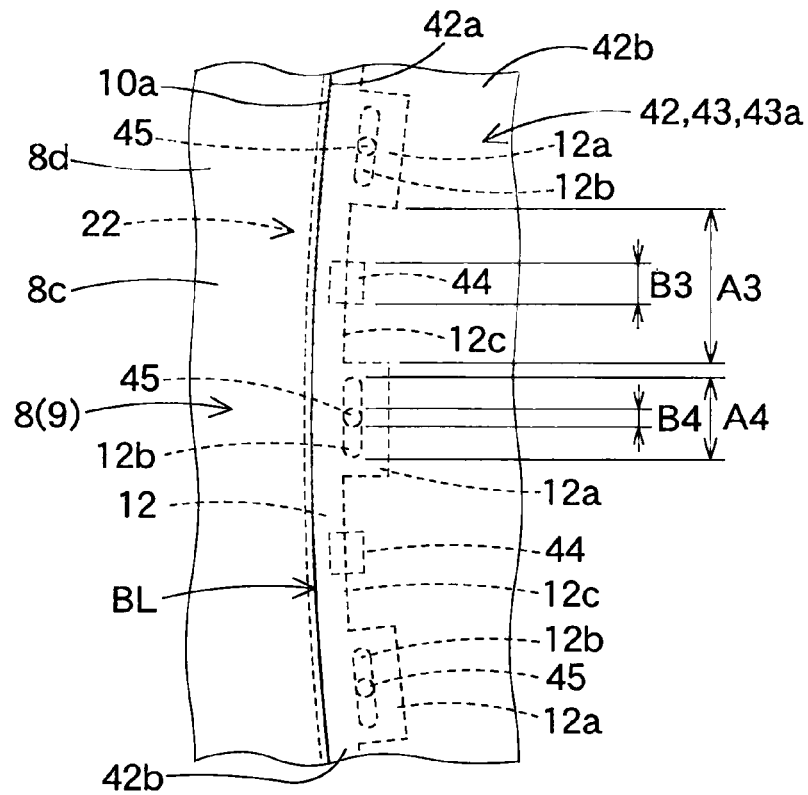
FIG. 8 is a schematic drawing when viewed from the direction VIII in FIG. 5.
Figure 9:
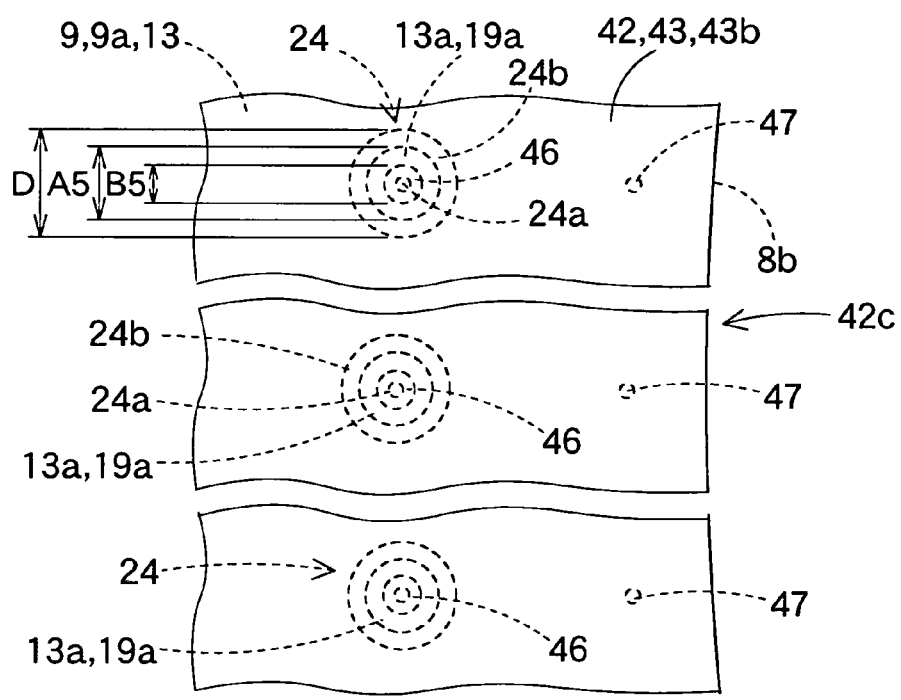
FIG. 9 is a schematic drawing when viewed from the direction IX in FIG. 5.

The inflators 33 are disposed at two positions which correspond to the left and right sides of the case 26, and are substantially in the shape of narrow cylinders each having a gas injection port (not shown). The inflators 33 are, as shown in FIG. 2, connected to the airbag 38 so as to be capable of flowing inflation gas into the airbag 38. The respective inflators 33 are retained by brackets 34 formed of sheet metal as shown in FIG. 3. The respective inflators 33 are fixedly mounted to the case 26 by fixing the brackets 34 to the bottom wall portion 31 of the case with the bolts 35.

The airbag 38 is deployed and inflated by being supplied with inflation gas injected from the inflators 33. In the case of the first embodiment, the airbag 38 is formed into a bag shape using textile fabric of polyester yarn or polyamide yarn or the like. The airbag 38 has a U-shape which is wide in the lateral direction when viewed from the front when it is completely inflated as shown by a chain double-dashed line in FIGS. 1 and 2. In other words, the airbag 38 after having inflated completely includes a main body portion 39 disposed along the lateral direction and pillar cover portions 40, 40 extending from the left and right ends of the main body portion 39 rearward so as to cover the front surfaces of the front pillars 4, 4. The main body portion 39 covers substantially the entire length in the lateral direction over the area from the upper surface of the hood panel 8 near the rear portion 8a thereof to the position near the lower portion of the front wind shield 3 when the airbag 38 is completely inflated.

Then, a cowl 2 is disposed between the hood panel 8 and the front windshield 3. The cowl 2 includes a cowl panel 2a and a cowl louver 2b disposed above the cowl panel 2a. Therefore, the main body portion 39 of the airbag 38 substantially covers the upper side of the rear portion 8a of the hood panel 8 and the cowl 2 entirely when the inflation is completed.

The airbag cover 42, being formed of synthetic resin such as olefin thermoplastic elastomer, includes a case covering portion 49 and a general positioning portion 43. The case covering portion 49 covers the upper side of an opening 26a surrounded by the side wall portion 27 of the case 26. The general positioning portion 43 does not cover the upper side of the case 26, but rather covers the upper side of the hood panel 8. The airbag cover 42 is disposed over the entire area along the direction of the width of the hood panel 8, that is, along the lateral direction above the rear portion 8a of the hood panel 8. The airbag cover 42 upper surface is continuous with the upper surface 8d of the front portion 8c of the hood panel 8 and extends above the rear edge 8b. In other words, the airbag cover 42 is arranged in such a manner that the front surface 42a abuts the front edge 10a of the stepped portion 10 of the outer panel 9 in the longitudinal direction, and the upper surface of the front edge 42b is flush with the upper surface 8d of the hood panel 8 on the side of the front portion 8c in level.

Since the case 26 lateral width is smaller than the lateral width of the hood panel 8, the case covering portion 49 is also slightly smaller than the width of the airbag cover 42. Consequently, the general positioning portion 43 is disposed so as to surround the front, rear, left and right of the case covering portion 49. In other words, a front portion 43a of the general positioning portion 43 is disposed in front of the case cover 49, a rear portion 43b of the general positioning portion 43 is disposed on the rear side of the case cover 49, and a left portion 43c and a right portion 43d of the general positioning portion 43 are disposed on the left and right sides of the case cover 49 as shown in FIG. 2.

The case covering portion 49 includes the flap portion 51 which is pushed and opened by the airbag 38 when inflated, and a connecting wall portion 50 (50A, 50B) disposed thereon. The flap portion 51 is surrounded by the side wall portion 27 of the case 26, and is disposed in the area between the connecting wall portions 50A, 50B. Therefore, the flap portion 51 has a curved shape projecting forward at the lateral center thereof when viewed from above. The flap portion 51 is surrounded by the breakaway portion 53 formed by providing a continuous or discontinuous thinned portion. The breakaway portion 53 extends from the rear edge through the left and right edges and slightly into the front edge. When the flap portion 51 is pushed by the airbag 38 being inflated, the flap portion 51 opens upward toward the front with the front edge side of the flap portion 51 where the breakaway portion 53 is not provided as a hinge portion 52.

The connecting wall portions 50A, 50B are disposed in the front side and the back side of the flap portion 51 with the breakaway portion 53 between them, and extend respectively in the vertical direction. The front and rear connecting wall portions 50 are curved so as to project forward at the portion near the lateral center so as to correspond to the front and rear wall portions 27a, 27b of the side wall portion 27 of the case 26. The connecting wall portions 50 are provided with recesses and projections on the lower surface thereof as shown FIGS. 5, 6. At the projections 50a of the respective connecting wall portions 50A, 50B projecting downward are formed connecting holes 50b in a rectangular shape, the holes penetrating in the longitudinal direction. The lateral plate portions 29a of the respective connecting strips 29 of the case 26 are inserted into the respective connecting holes 50b, and the peripheral edges of the connecting holes 50b are engaged to the engaging plate portions 29b.

The connecting holes 50b and the connecting strips 29 constitute connecting devices 23 for connecting the connecting wall portion 50 formed of synthetic resin to the case 26 formed of sheet metal when the airbag cover 42 is thermally expanded by heat so as to be capable of moving in the direction of the width, that is, in the lateral direction of the hood panel 8. The lateral width A1 of each connecting hole 50b is larger than the width B1 of the connecting strip 29 to be engaged (at least about 5 mm).

The dimensional difference is determined as needed considering the difference of expansion between the hood panel 8 and the airbag cover 42 at the maximum atmospheric temperature.

The respective fixing portions 28 are passed through the depressions 50c between the respective adjacent projections 50a of the respective connecting wall portion 50. The lateral width A2 of each depression 50c is larger than the width B2 of the fixing strip 28 so that the connecting wall portion 50 formed of synthetic resin is capable of moving also in the direction of the width of the hood panel 8 with respect to the case 26 formed of sheet metal when the airbag cover 42 is expanded by heat (at least about 5 mm).

The portion near the left and right ends of the airbag cover 42 can easily be displaced due to thermal expansion. Therefore, the connecting holes 50b or the depressions 50c are formed so that those near the center have smaller dimensions. That is, the connecting holes 50b or the depressions 50c located near the left and right ends may be larger than those located near the center in terms of the widths A1, A2 with respect to the width B1, B2.

As shown in FIGS. 3 to 5 and 8, a plurality of engaging hooks 44 and guide pins 45 project downward from the lower surface of the front portion 43a of the general positioning portion 43. The engaging hooks 44 and the guide pins 45 are disposed alternately along the lateral direction, more specifically, along the front edge 42a of the airbag cover 42. The rear edges 12c of the front portions 12 of the outer panel 9 are fitted into the recessed grooves 44a recessed in the respective engaging hooks 44 in the rearward direction. The guide pins 45, being formed into a cylindrical shape, are inserted into the guide holes 12b of the projections 12a of the front portion 12 of the outer panel 19.

The engaging hooks 44 and the guide pins 45 constitute mounting devices 22 together with the rear edge 12c and the guide holes 12b of the front portion 12 of the outer panel 9. The mounting devices 22 allow displacement of the airbag cover 42 in the widthwise direction while at the same time controlling the position of the airbag cover 42 with respect to the hood panel 8 in the vertical direction when the airbag cover 42 is expanded by heat. Then, the width A3 of the rear edge 12c between the adjacent projections 12a is determined to be larger than the width B3 of the engaging hook 44 (at least about 5 mm), and the lateral dimension A4 of the guide holes 12b is larger than the outer diameter B4 of the guide pins 45 (at least about 5 mm) so that the front portion 43a of the general positioning portion 43 formed of synthetic resin can be moved in the direction of the width of the hood panel 8 with respect to the hood panel (outer panel 9) 8 formed of sheet metal.

In this case as well, the portions near the left and right ends of the front portion 43a can easily be displaced with respect to the hood panel 8 due to thermal expansion. Therefore, the rear edges 12c between the projections 12a or the guide holes 12b near the center can be reduced in size. In other words, the rear edges 12c between the projections 12a or the guide holes 12b near the left and right ends may be determined to be larger than those near the center in terms of the dimensions A3, A4 with respect to the dimensions B3, B4.

The lower surface of the rear portion 43b of the general positioning portion 43 is formed with a plurality of column-shaped guide bosses 46 along the lateral direction so as to project downward as shown FIGS. 3 to 5, 9. A plurality of supporting projections 47 which abut against the upper surface 9b of the outer panel 9 are formed on the rear side of the guide bosses 46. The respective guide bosses 46 are inserted into the guide holes 13a, 19a of the hood panel 8 and attached to the outer panel 9 via tapping screws 24a with washers 24b. The screws 24a are screwed into the guide bosses 46. The screws 24a constitute mounting devices 24 together with the guide bosses 46 and the supporting projections 47. The mounting devices 24 control the position of the airbag cover 42 with respect to the hood panel 8 in the vertical direction, while allowing displacement of the airbag cover 42 in the lateral direction and the longitudinal direction when the airbag cover 42 is expanded by heat. Then, the inner diameter A5 of the guide holes 13a, 19a is larger than the outer diameter B5 of the guide bosses 46 (at least about 5 mm) so that the rear portion 43b of the general positioning portion 43 formed of synthetic resin can move in the lateral direction and the longitudinal direction of the hood panel 8 with respect to the hood panel 8 (outer panel 9) formed of sheet metal. The length L of the guide bosses 46 (see FIG. 5) is determined so that even when the washers 24b are tightened against the bosses 46, the washers 24b are not brought into strong press contact with the peripheral edges of the guide holes 19a of the hood panel 8, and the bosses 46 can move in the longitudinal direction and the lateral direction with respect to the hood panel 8. The outer diameter D of the washers 24b is larger than the inner diameter A5 of the guide holes 13a, 19a so that the washers 24b are prevented from falling into the guide holes 19a.

In this case as well, the portions near the left and right ends of the rear portion 43b or the portion near the rear end can easily be displaced with respect to the hood panel 8 due to thermal expansion. Therefore, the inner diameter A5 of the guide holes 13a, 19a with respect to the outer diameter B5 of the bosses 46 may be determined so that those near the center have smaller dimensions or those near the front side have smaller dimensions. In other words, the inner diameter A5 of the guide holes 13a, 19a with respect to the outer diameter B5 of the bosses 46 may be determined so that those located near the left and right ends are larger than those located near the center, and those located near the rear end are larger than those located on the front side.

In the pedestrian airbag system M1 of the first embodiment, when the operation signal is supplied to the inflators 33 in the state of being mounted to the vehicle, inflation gas is injected from the inflators 33, and the airbag 38 is inflated while allowing inflation gas to flow therein. Therefore, the flap portion 51 of the airbag cover 42 is pushed by the airbag 38 and opens toward the front of the vehicle V while breaking the breakaway portion 53, and then the airbag 38 projects upward from the opening 26a of the case 26, so that the inflation is completed as shown by chain double-dashed line in FIGS. 1 and 2.

In this case, in the pedestrian airbag system M1 according to the first embodiment, even though the airbag cover 42 formed of synthetic resin is widely disposed over the entire area in the direction of the width of the hood panel 8 on the side of the rear portion 8a of the hood panel 8 formed of the sheet metal, the airbag cover 42 is mounted to the hood panel 8 so as to be capable of moving in the direction of the width of the hood panel 8.

In other words, on the front portion 43a of the general positioning portion 43 of the airbag cover 42 is provided with the mounting devices 22 for mounting the front portion 43a to the hood panel 8 so as to be capable of controlling the position of the airbag cover 42 with respect to the hood panel 8 in the vertical direction, while allowing displacement of the cover 42 in the widthwise direction when the airbag cover 42 is expanded by heat. More specifically, a specified number of engaging hooks 44 and the guide pins 45 constituting the mounting devices 22 are provided along the front edge 42a of the airbag cover 42, and the rear edge 12c of the front portion 12 of the outer panel 9 is inserted into the recessed grooves 44a recessed rearward in the respective engaging hooks 44, and the guide pins 45 are inserted into the guide holes 12b of the projections 12a of the front portion 12 of the outer panel. Then, the width A3 of the rear edge 12c between the adjacent projections 12a is determined to be larger than the width B3 of the engaging hook 44, and the lateral dimension A4 of the guide holes 12b is larger than the outer diameter B4 of the guide pins 45. Therefore, the front portion 43a of the airbag cover 42 can be moved in the direction of the width of the hood panel 8 with respect to the hood panel 8 without interfering with the hood panel 8 even when the width of the front portion 43a of the airbag cover 42 is significantly expanded by heat, so that the appearance is not deteriorated.

In the same manner, the rear portion 43b of the airbag cover 42 is provided with the mounting device 24 for mounting the rear portion 43b to the hood panel 8 so as to control the position of the airbag cover 42 with respect to the hood panel 8 in the vertical direction while allowing the widthwise displacement of the cover 42 when the airbag cover 42 is expanded by heat. More specifically, the predetermined numbers of guide bosses 46 and the supporting projections 47 which constitute the mounting devices 24 are provided along the rear edge 8b of the hood panel 8, and the supporting projections 47 are brought into abutment with the upper surface 9b of the outer panel 9. The guide bosses 46 are inserted into the guide holes 13a, 19a of the hood panel 8 and are attached to the outer panel 9 by the tapping screws 24a with the washers 24b so as to constrain the vertical movement. The inner diameter A5 of the guide holes 13a, 19a is determined to be larger than the outer diameter B5 of the guide bosses 46. Therefore, even when the width of the rear portion 43b of the airbag cover 42 is significantly expanded with respect to the hood panel 8 by heat, the rear portion 43b can move in the direction of the width of the hood panel 8 without interfering with the hood panel 8 so that the appearance is not deteriorated.

Furthermore, in the case covering portion 49 of the airbag cover 42, the lateral width A1 of the respective connecting holes 50b is determined to be larger than the width B1 of the connecting strips 29 to be engaged with the holes 50b, and the lateral width A2 of the recesses 50c between the adjacent projections 50a of the respective connecting wall portions 50A, 50B is determined to be larger than the width B2 of the fixing strips 28 which pass through the recesses 50c, whereby the connecting wall portions 50A, 50B of the synthetic resin are connected to the case 26 formed of sheet metal so as to be movable in the direction of the width of the hood panel 8, that is, in the lateral direction, when the airbag cover 42 is expanded by heat. Therefore, even when the width of the case covering portion 49 of the airbag cover 42 is significantly expanded by heat, the case covering portion 49 can be moved in the lateral direction of the hood panel 8 without interfering with the hood panel 8, so that the appearance is not deteriorated.

The airbag cover 42 is disposed so that its upper surface is continuous with the upper surface 8d of the front portion 8c of the hood panel 8. Therefore, the airbag cover 42 appears to be integral with the hood panel 8, whereby the appearance of the airbag system M1 can be improved.

Therefore, in the pedestrian airbag system M1 in the first embodiment, deformation of the airbag cover 42, disposed widely at the rear portion 8a of the hood panel 8, by thermal expansion can be prevented, and hence deterioration of appearance of the airbag cover 42 can be prevented.

In the pedestrian airbag system M1 according to the first embodiment, the airbag cover 42 is disposed over the entire area in the direction of the width of the hood panel 8. Therefore, in the airbag system M1, no break between the airbag cover and the hood panel 8 exists on the airbag cover 42 at the lateral ends of the hood panel 8, and hence the appearance on the side of the upper surface of the hood panel 8 can be improved.

In the first embodiment, the airbag cover 42 includes the case covering portion 49 having the flap portion 51 which opens when pushed by the airbag 38 being inflated, and covering the upper side of the case 26, and the general positioning portion 43. The case covering portion 49 is disposed on the front side of the airbag cover 42 apart from the rear end 8b of the hood panel 8, and the rear portion 43b of the general positioning portion 43 is disposed toward the rear edge 8b of the hood panel 8.

In this arrangement, the design of the upper surface 8d of the hood panel 8 can be improved even if the case 26 accommodating the folded airbag 38 is disposed near the front edge 10a of the rear portion 8a of the hood panel 8, that is, near the center of the hood panel 8 in the longitudinal direction, and the airbag cover 42 is disposed so that the case 26 is covered by the case covering portion 49. This is because the airbag cover 42 covers over the long area in the longitudinal direction from the position above the case 26 to the rear edge 8b of the hood panel 8. Therefore, the airbag system M1 can be mounted to the hood panel 8 only so that there is only one break between the hood panel 8 and the airbag cover 42 in the longitudinal direction, that is, a break BL in the longitudinal direction on the upper surface 8d of the hood panel 8. Consequently, the airbag system M1 can be mounted to the hood panel 8 by providing only one break BL in the longitudinal direction, and hence the design of the hood panel 8 on the side of the upper surface 8d can be improved.

In the first embodiment, the general positioning portion 43 (the rear portion 43b) near the rear edge 8b of the hood panel 8 is attached to the hood panel 8 so as to be capable of moving in the longitudinal direction of the hood panel 8. In other words, the mounting devices 24 are disposed so as to control the position of the airbag cover 42 with respect to the hood panel 8 in the vertical direction and allow the displacement in the widthwise direction and the longitudinal direction when the airbag cover 42 is expanded by heat. More specifically, the supporting projections 47 which constitute the mounting devices 24 are brought into abutment with the upper surface 9b of the outer panel 9 and the guide bosses 46 constituting the mounting devices 24 are inserted into the guide holes 13a, 19a of the hood panel 8 and the general positioning portion 43 (the rear portion 43b) is attached to the outer panel 9 by the tapping screws 24a with the washers 24 so that the vertical movement is constrained. Then, the inner diameter A5 of the guiding holes 13a, 19a is determined to be larger than the outer diameter B5 of the guide bosses 46 not only in the widthwise direction but also in the longitudinal direction. Therefore, even when expansion in the longitudinal direction occurs by heat over the entire airbag cover 42 which is elongated in the longitudinal direction, the airbag cover 42 can expand rearward without interfering with the hood panel 8, and hence deterioration of the appearance of the airbag cover 42 can be prevented.

In the case of the first embodiment, the length of the lateral plate portions 29a of the connecting strips 29B provided on the rear wall portion 27b of the side wall portion 27 of the case 26 is longer in the longitudinal direction than the lateral plate portions 29a of the front side connecting strip 29A, and also longer than the thickness (length of the connecting holes 50b) of the connecting wall portion 50B. Therefore, even when the portion near the case covering portion 49 of the airbag cover 42 is expanded in the longitudinal direction by heat, the rear side connecting wall portion 50B can be moved rearward with respect to the front side connecting wall portion 50A, whereby deterioration of the appearance near the case covering portion 49 can be prevented.

In the airbag system M1 of the first embodiment, the hood panel 8 includes the outer panel 9 on the side of the upper surface, and the inner panel 15 located on the side of the lower surface side and having strength larger than the outer panel 9. Then, the case 26 is firmly fixed to the inner panel 15 by the use of the connecting devices 21 including the bolts 21a and the nuts 21b. The front edge 42a side of the airbag cover 42 is attached to the outer panel 9 by the use of the mounting devices 22 including the engaging hooks 44 and the screws 42. Therefore, since the case 26 which receives a reaction force generated when the airbag 38 of the airbag system M1 projects upon inflation is firmly fixed to the inner panel 15 of the hood panel 8 having strength, the airbag system M1 can be mounted on the hood panel 8 stably. Since the front edge 42a of the airbag cover 42 is attached to the outer panel 9 at the upper surface of the hood panel 8, the front edge 42a of the airbag cover 42 located at the portion of the break BL can easily be aligned with the front edge 10a of the stepped portion 10 of the outer panel 9, and consequently, the appearance of the front side of the airbag cover 42 is improved.

Furthermore, in the case of the first embodiment, the rear edge 42c of the airbag cover 42 is also connected to the outer panel 9 by the use of the mounting devices 24. Therefore, in the first embodiment, lifting or sinking of the rear edge 42c side can adequately be prevented, and hence design of the appearance of the rear portion of the airbag cover 42 can also be improved.

Figure 10:
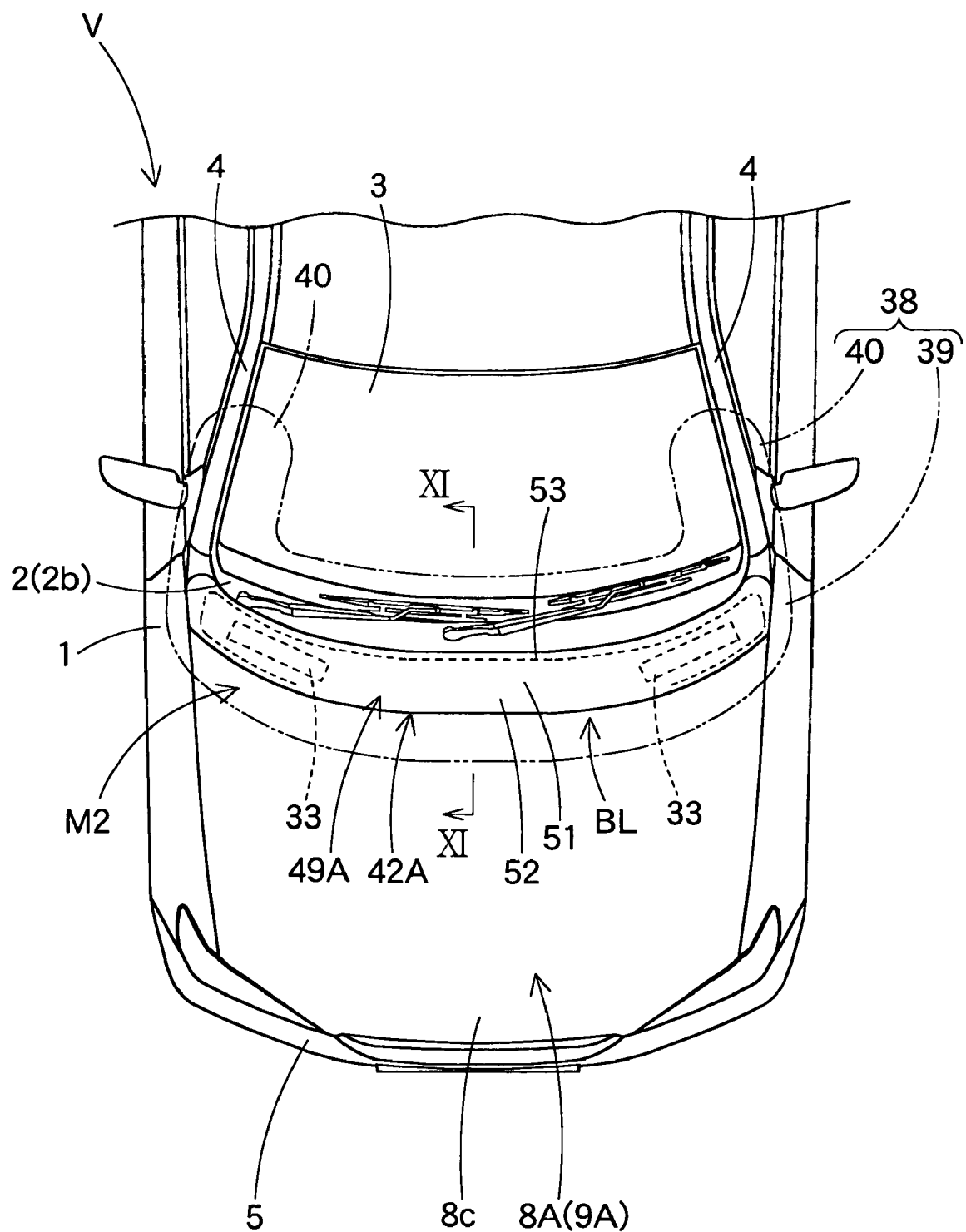
FIG. 10 is a plan view of the vehicle on which a pedestrian airbag system according to a second embodiment is mounted.
Figure 11:
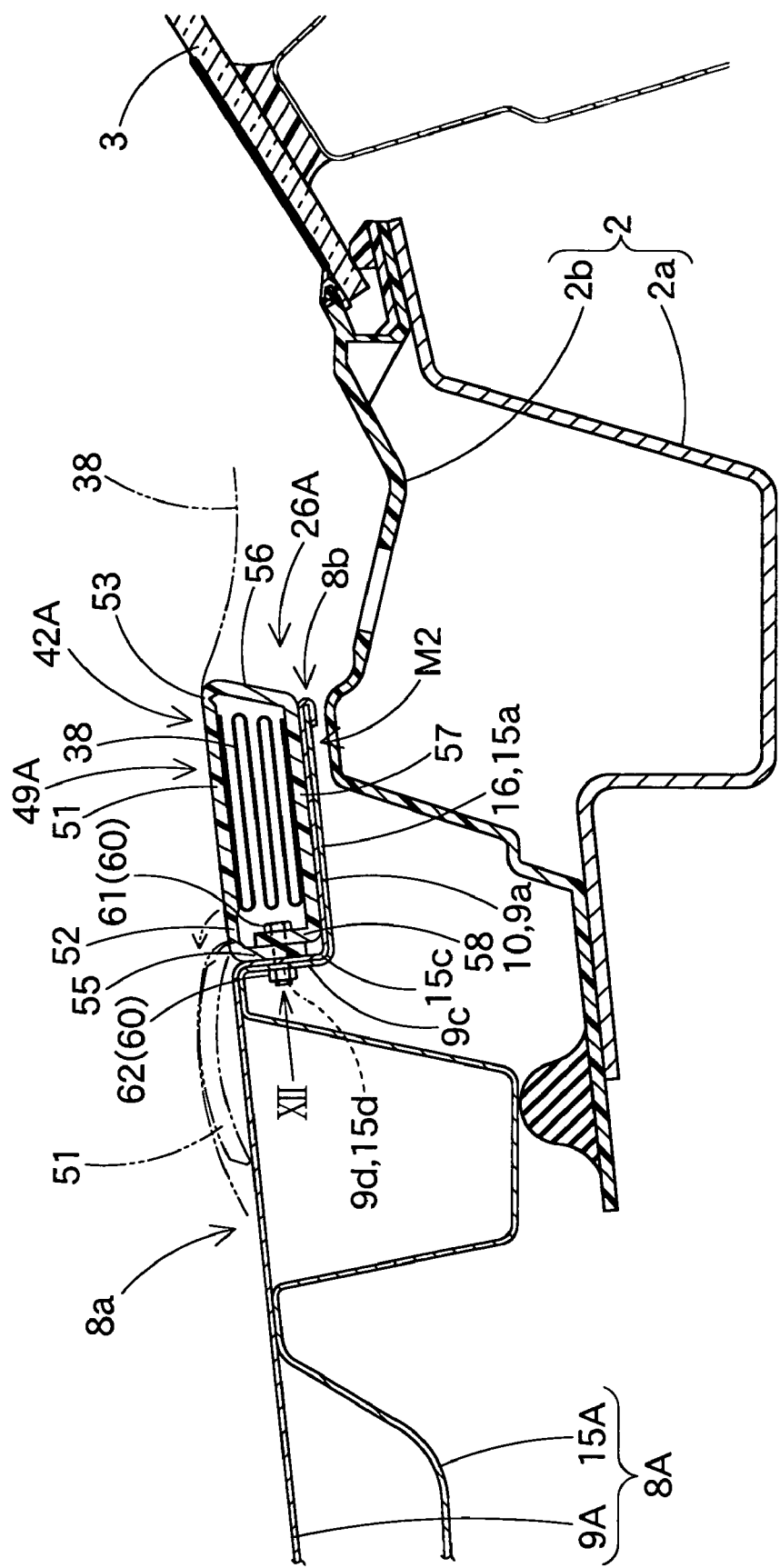
FIG. 11 is a schematic cross-sectional view of the pedestrian airbag system according to the second embodiment shown in FIG. 10 taken along the longitudinal direction of the vehicle, which corresponds to the portion along XI-XI in FIG. 10.
Figure 12:
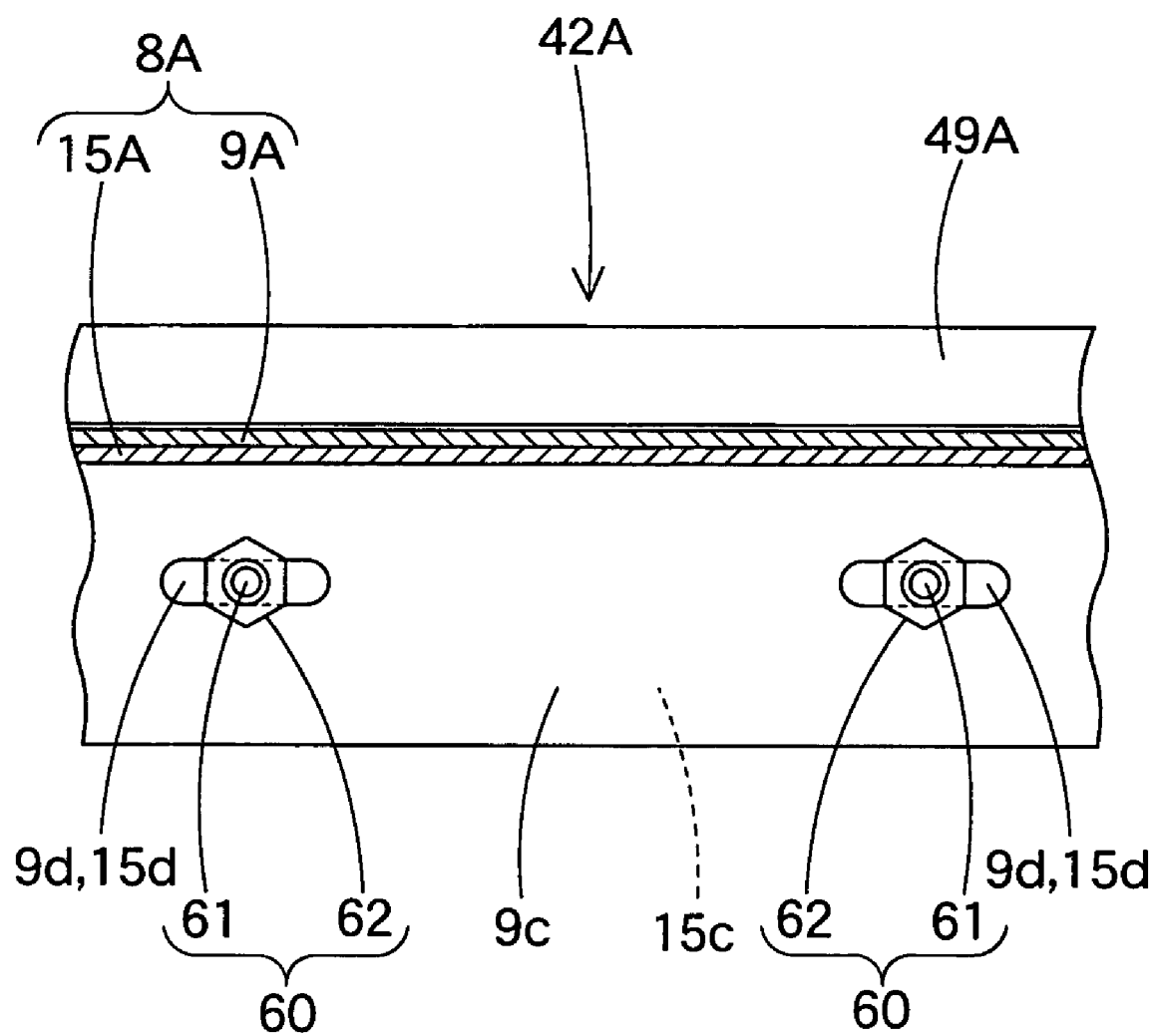
FIG. 12 is a schematic drawing when viewed from the direction XII in FIG. 11.

The pedestrian airbag system may be configured as a pedestrian airbag system M2 according to a second embodiment shown in FIGS. 10 to 12. In the airbag system M2 according to the second embodiment, the airbag cover 42A formed of synthetic resin includes a case covering portion 49A for covering the upper side of a case 26A, and the case covering portion 49A includes the flap portion 51 which is opened by being pressed by the airbag 38 when inflated. The case covering portion 49A is disposed over the entire area in the direction of the width of a hood panel 8A, and over the entire longitudinal range of the airbag cover 42A, up to the rear edge 8b of the hood panel 8A.

In this arrangement, the length of the airbag cover 42A in the longitudinal direction can be reduced by mounting the airbag cover 42A on the rear end 8b side of the hood panel 8A. In this arrangement, even when the airbag cover 42A is expanded in the longitudinal direction by heat, the airbag cover 42A is disposed at the rear end 8b of the hood panel 8A, and therefore the airbag cover 42A can expand rearward freely, preventing deterioration of the appearance of the airbag cover 42A.

In the second embodiment, the airbag cover 42A does not include the general positioning portion for covering the upper portion of the hood panel 8A on the front or rear sides of the case covering portion 49A. In addition, the case covering portion 49A includes side wall portions 55, 56 extending downward from the front and rear of the flap portion 51, a bottom wall portion 57 extending forward from the lower end of the side wall portion 56 and being disposed below the folded airbag 38, and an extending portion 58 extending upward from the bottom wall portion 57. Then, the side wall portion 55 and the extending portion 58 on the front side are overlapped, and secured together to the hood panel 8A by the use of the plurality of bolts 61 and nuts 62 which constitute the joint connection devices 60, whereby the case covering portion 49A is assembled to the hood panel 8A.

The hood panel 8A includes stepped portions 10, 16 on the outer panel 9A and an inner panel 15A stepped downward on the side of the rear end 8b. Vertical wall portions 9c, 15c at the front edge of the stepped portions 10, 16 are formed with a plurality of mounting holes 9d, 15d disposed along the direction of the width of the hood panel 8A. The respective mounting holes 9d, 15d, being capable of receiving bolts 61 inserted therethrough, are formed elongated in the lateral direction (the direction of the width of the hood panel 8A). Therefore, the airbag cover 42A is displaced and moved with respect to the hood panel 8A without being deformed even when it is expanded in the widthwise direction by heat.

Then, in the airbag system M2 in the second embodiment, the case 26A, being formed of synthetic resin such as olefin thermoplastic elastomer, includes the side wall portions 55, 56, the bottom wall portion 57, and the extending portion 58. The case 26A accommodates the folded airbag 38 and the inflator, not shown, for supplying inflation gas to the airbag 38. In this manner, even though the case 26A is formed of synthetic resin, it is fixed to the strong inner panel 15 of the hood panel 8A, formed of sheet metal, by the use of the joint connection devices 60. Therefore, from the case 26A, the airbag 38 can be projected stably. In addition, the case 26A is formed integrally with the case cover 49A provided with the flap portion 51, which opens when the airbag 38 is inflated, and wraps the folded airbag 38 and the inflators into a cylindrical shape. Therefore, the case 26A can accommodate and retain the airbag 38 and the inflators stably.

In the case of the second embodiment, the airbag cover 42A is integrated with the case 26A, and the side wall portion 55 near the front edge is attached to the outer panel 9A by the use of the joint connection devices 60. Therefore, there is a minimal break between the airbag cover 42A and the outer panel 9A.

The wall portions on both lateral sides of the case 26A may be formed of sheet metal so as to extend from the outer panel 9 or the inner panel 15 of the hood panel 8A. Alternatively, the wall portions on the lateral sides of the case 26A may be formed of synthetic resin so as to extend upward from the bottom wall portion 57.

Although the wall portions are formed of sheet metal in the case 26 according to the first embodiment, they may be formed of synthetic resin as long as sufficient strength for projection of the airbag 38 can be secured.

Figure 13:
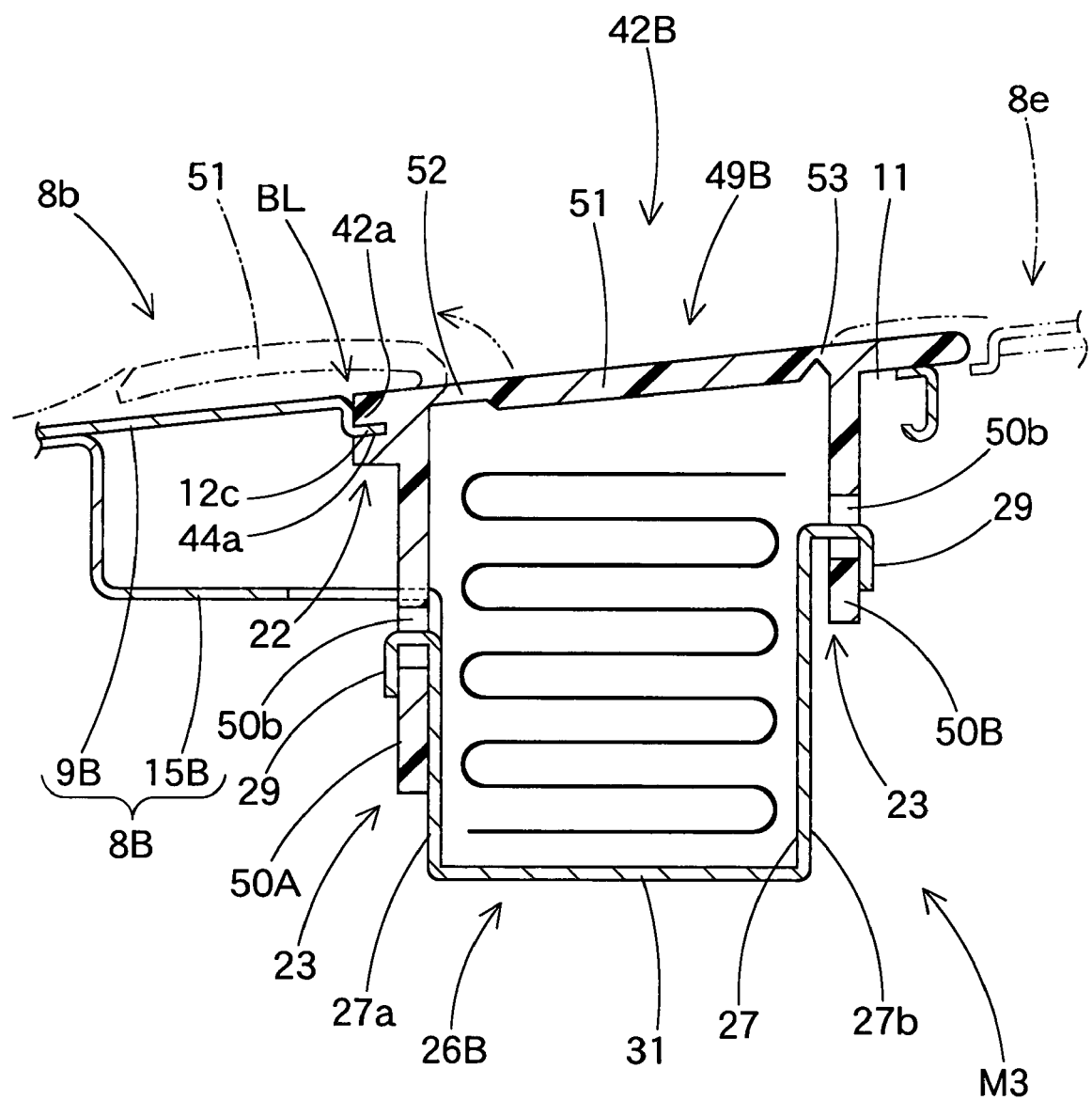
FIG. 13 is a schematic cross-sectional drawing of a pedestrian airbag system according to a third embodiment taken along the longitudinal direction of the vehicle.

A case 26B for accommodating the folded airbag 38 or the inflators, not shown, as in the case of a pedestrian airbag system M3 according to a third embodiment shown in FIG. 13 may be composed of an inner panel 15B itself so as to be formed integrally with the inner panel 15B of a hood panel 8B. With the airbag system M3 as well, the front edge 12c at the peripheral edge of the placement hole 11 of an outer panel 9B of the hood panel 8B at the front edge 42a of an airbag cover 42B is fitted into the recess groove 44a extending in the lateral direction (the direction of the width of the hood panel 8B). Therefore, alignment between the front edge 42a of the airbag cover 42B and the outer panel 9B which is located at the portion of the break BL between the airbag cover and the hood can be achieved easily, whereby design of the airbag cover 42B is improved. The case 26B is integrally joined with the inner panel 15B. Therefore, the case 26B is stably supported.

The airbag system M3 includes mounting devices 22 for mounting the airbag cover 42B to the outer panel 9B so as to control the vertical movement. The mounting devices 22 include recessed grooves 44*a* formed in the front edge 42*a* of the airbag cover so that the front edge 42*a* move laterally with respect to the edge 12*c*. The airbag system M3 is also provided with the connecting devices 23 for joining the front and rear side connecting wall portions 50A, 50B of the case covering portion 49B of the airbag cover 42B to the case 26B, and in the configuration of these connecting devices 23, the lateral width of the connecting holes 50*b* of the connecting wall portions 50A, 50B is larger than the width of the connecting strips 29 of the case 26B to be engaged with the holes 50*b*. Therefore, even when the airbag cover 42B is expanded in the direction of width of the hood panel 8B by heat, the airbag cover 42B is moved easily in the lateral direction, thereby preventing deformation thereof.

Since the length of the airbag cover 42B in the longitudinal direction is short in the third embodiment, even when the airbag cover 42B is expanded by heat, expansion thereof in the longitudinal direction with respect to the hood panel 8B is reduced, whereby there is no risk of deformation of the airbag cover 42B. Here, displacement or movement of the airbag cover 42B toward the rear is not taken into consideration. When rearward movement of the airbag cover 42B is small, it is also possible to dispose the airbag cover 42B in the middle of the hood panel in the longitudinal direction, and dispose the rear end 8*e* of the hood panel 8B rearwardly of the airbag cover 42B as shown by chain double-dashed line in FIG. 13.

Figure 14:
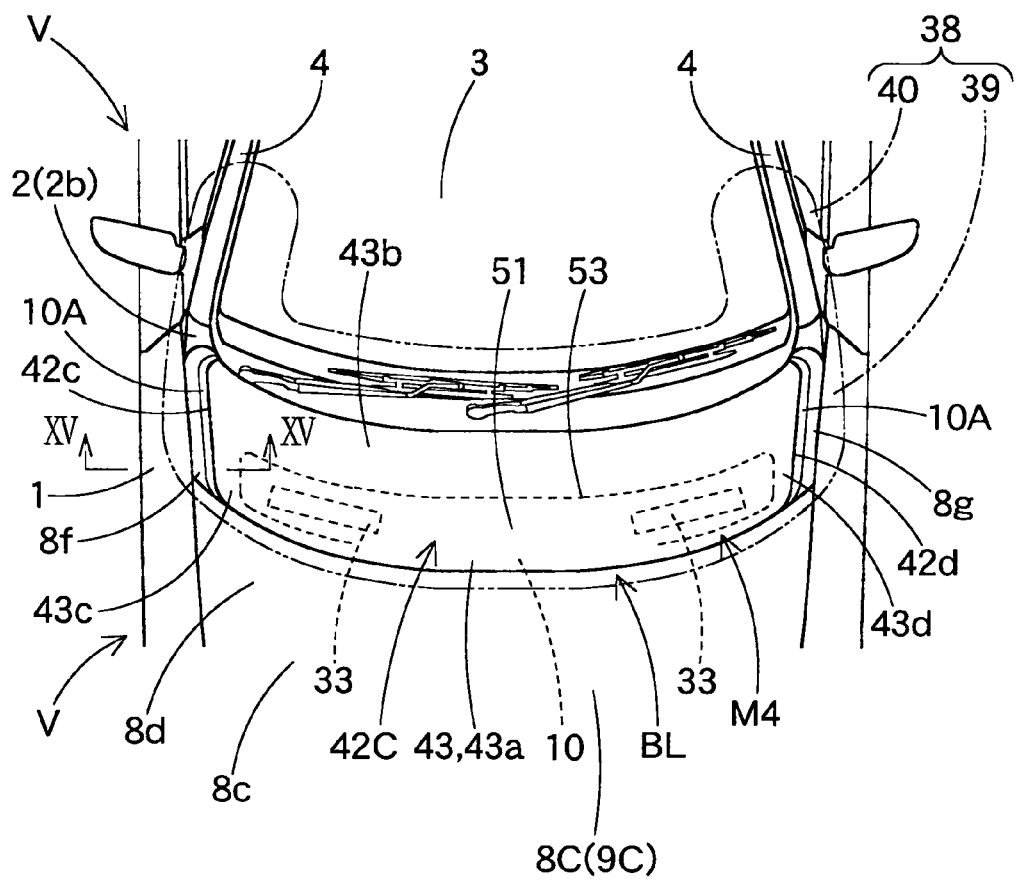
FIG. 14 is a plan view of a vehicle on which a pedestrian airbag system according to a fourth embodiment is mounted.
Figure 15:
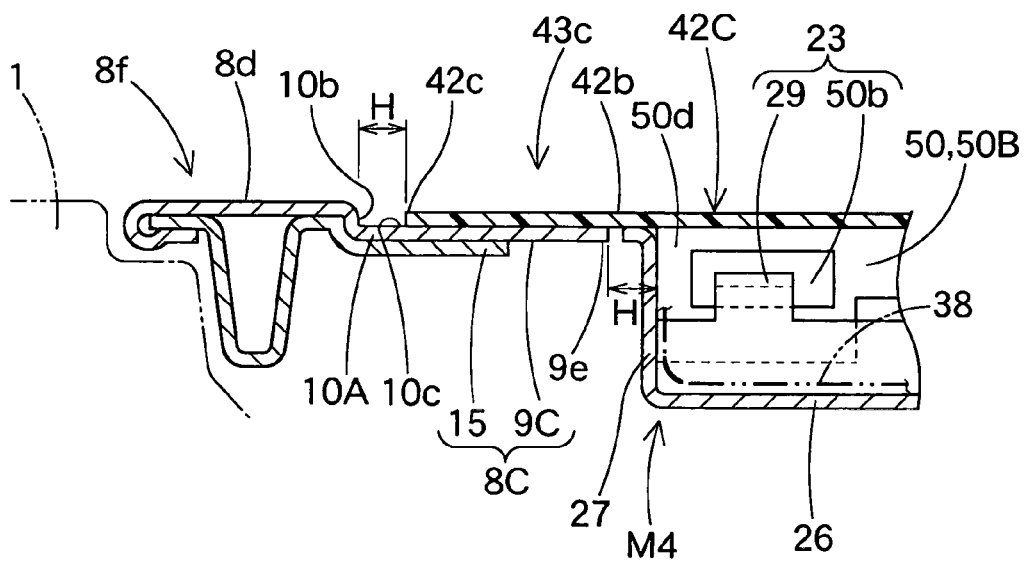
FIG. 15 is a schematic partial cross-sectional view of the pedestrian airbag system according to the fourth embodiment shown in FIG. 14, taken along the widthwise direction of the hood panel, which corresponds to the portion XV-XV in FIG. 14.

Although the case in which the airbag cover is disposed over the entire area of the hood panel in the widthwise direction has been described in the respective embodiment, it may be configured as a pedestrian airbag system M4 according to a fourth embodiment shown in FIG. 14, and FIG. 15. In the fourth embodiment, an airbag cover 42C is larger in the lateral direction than in the longitudinal direction. However, the airbag cover 42C is not disposed over the entire area of a hood panel 8C in the widthwise direction. In other words, the left and right edges 42*c*, 42*d* of the airbag cover 42C are removed from both left and right edges 8*f*, 8*g* of the hood panel 8C toward the center of the vehicle V, so that the left and right edges 8*f*, 8*g* of the hood panel 8C are exposed upward. In this structure as well, a stepped portion 10A is provided on the side of the lower surfaces of the edges 42*c*, 42*d* of the airbag cover 42C by depressing the outer panel 9C downward. In addition, in the stepped portion 10A, a side portion edge 10*b* extending downward from the upper surface 8*d* of the hood panel 8C is provided at the left and right edges 42*c*, 42*d* of the airbag cover 42C with a gap H between the edges. Therefore, even when the airbag cover 42C, being larger in width than in dimension in the longitudinal direction, is expanded in the lateral direction by heat and hence the left side portion 43*c* or the right side portion 43*d* of the general positioning portion 43 are moved so as to expand both left and right in the direction of the width of the hood panel 8C, the airbag cover 42C easily slides on the stepped portion 10A filling the gap H, and is not hindered by the outer panel 9C.

The connecting wall portion 50 is disposed on the side of the lower surface near the left and right edges 42*c*, 42*d* of the airbag cover 42C. The gap H is also provided between an edge 50*d* of the connecting wall portion 50 in the lateral direction and an inner edge 9*e* of the stepped portion 10A of the hood panel 8C. Therefore, even when the connecting wall portion 50 is expanded in the lateral direction beyond the case 26 by heat, collision with the hood panel 8C which may cause deformation is prevented.

Therefore, even when the airbag cover 42C is not disposed over the entire area in the direction of the width of the hood panel 8C and is disposed in such a manner that the left and right edges 8*f*, 8*g* of the hood panel 8C near the left and right edges 42*c*, 42*d* of the airbag cover 42C are exposed upward, deformation of the airbag cover 42C by thermal expansion can be prevented.

In the pedestrian airbag system M4 according to the fourth embodiment, the airbag cover 42C is slightly smaller in lateral width than the airbag cover 42 according to the first embodiment, and the lateral edges 8*f*, 8*g* of the hood panel 8C are exposed upwardly by providing the stepped portion 10A. In the pedestrian airbag system M4 according to the fourth embodiment, only these points are different, and other structures such as the airbag 38 or the inflators 33 are the same as the first embodiment. The airbag cover 42C is provided with the connecting devices 23 or the mounting devices 22, not shown, and is attached to the hood panel 8C so as to be capable of moving in the direction of the width of the hood panel 8C.

The stepped portion 10A is formed so as to be substantially continuous in level with the stepped portion 10 of the outer panel 9C located downwardly of the front end portion 43*a* of the general positioning portion 43 of the airbag cover 42C, the upper surface 8*d* of the edges 8*f*, 8*g* of the hood panel 8C is substantially continuous with the upper surface 8*d* of the front portion 8*c* of the hood panel 8C. Therefore, the upper surface 8*d* of the edges 8*f*, 8*g* of the hood panel 8C is also substantially flush with the upper surface 42*d* of the airbag cover 42C.

Therefore, according to the fourth embodiment, part 10*c* of the stepped portion 10A is disposed between the edges 8*f*, 8*g* of the hood panel 8C and the edges 42*c*, 42*d* of the airbag cover 42C. However, since the upper surface 8*d* of the left and right edges 8*f*, 8*g* or the front portion 8*c* of the hood panel 8C and the upper surface 42*b* of the airbag cover 42C are substantially flush with each other, in the fourth embodiment, design near the airbag cover 42 can be improved to the utmost.

Figure 16:
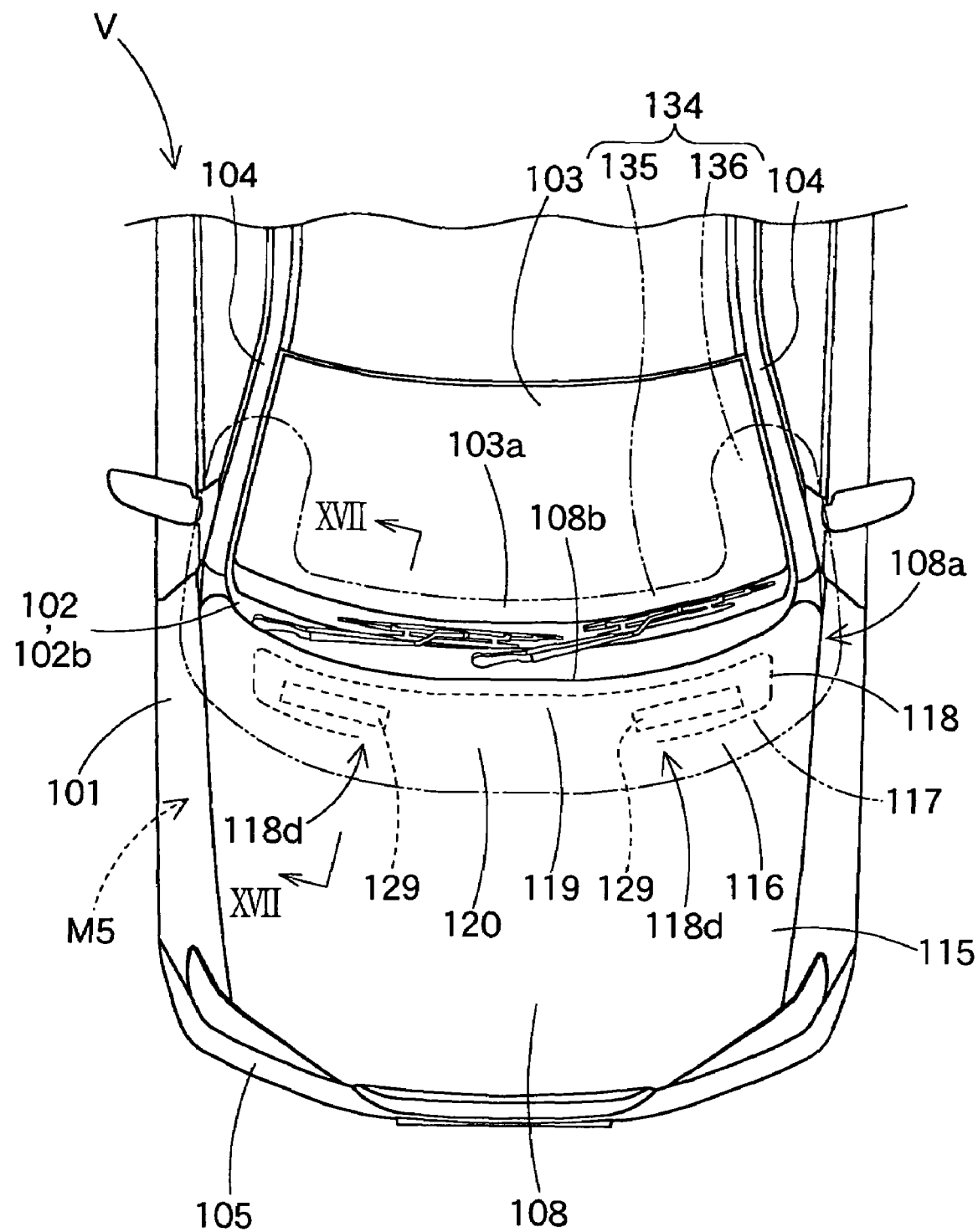
FIG. 16 is a plan view of a vehicle on which a pedestrian airbag system according to a fifth embodiment is mounted.
Figure 17:
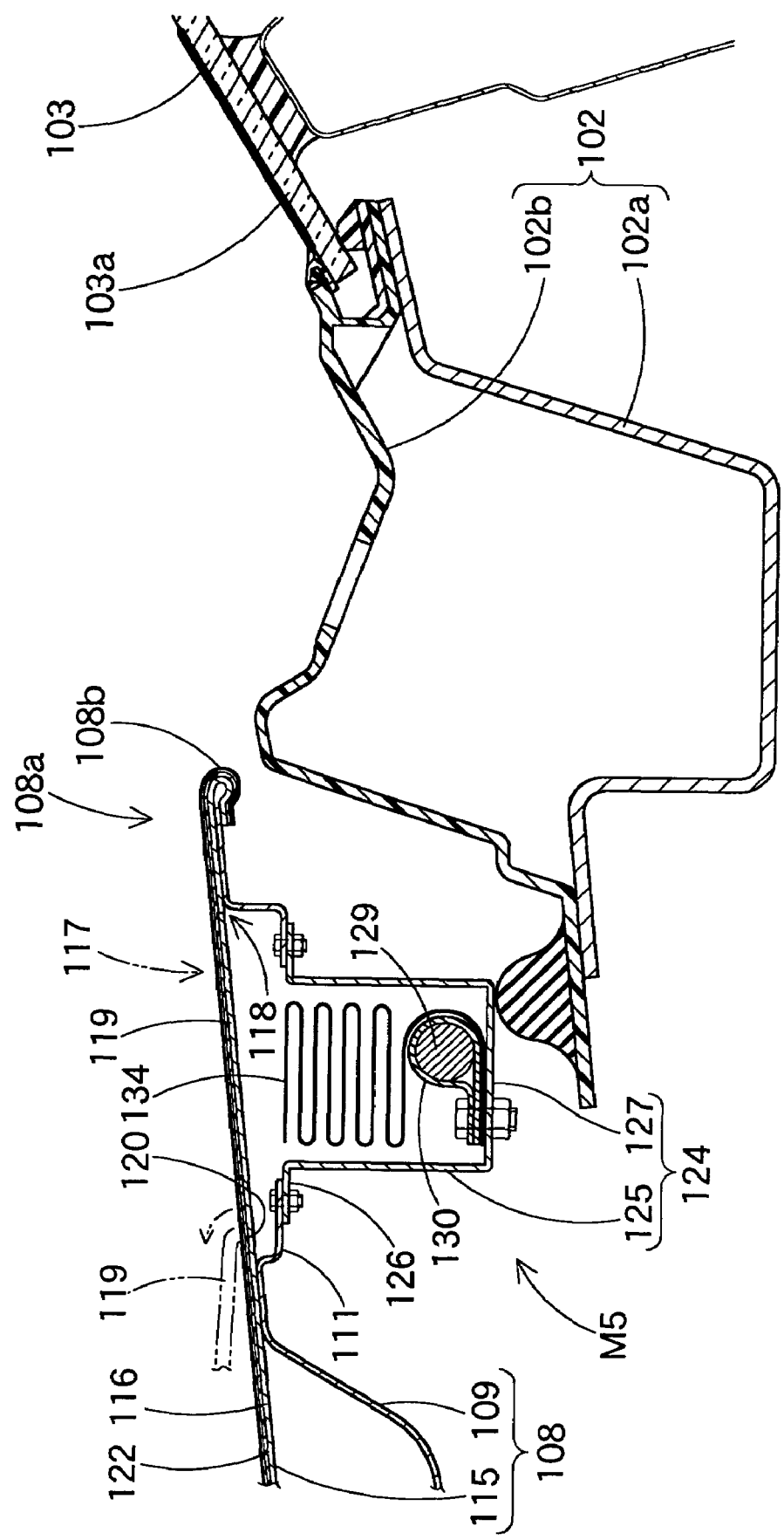
FIG. 17 is a schematic vertical cross-sectional view of the pedestrian airbag system according to the fifth embodiment shown in FIG. 16, taken along the longitudinal direction of the vehicle, which corresponds to the portion along XVII-XVII in FIG. 16.
Figure 18:
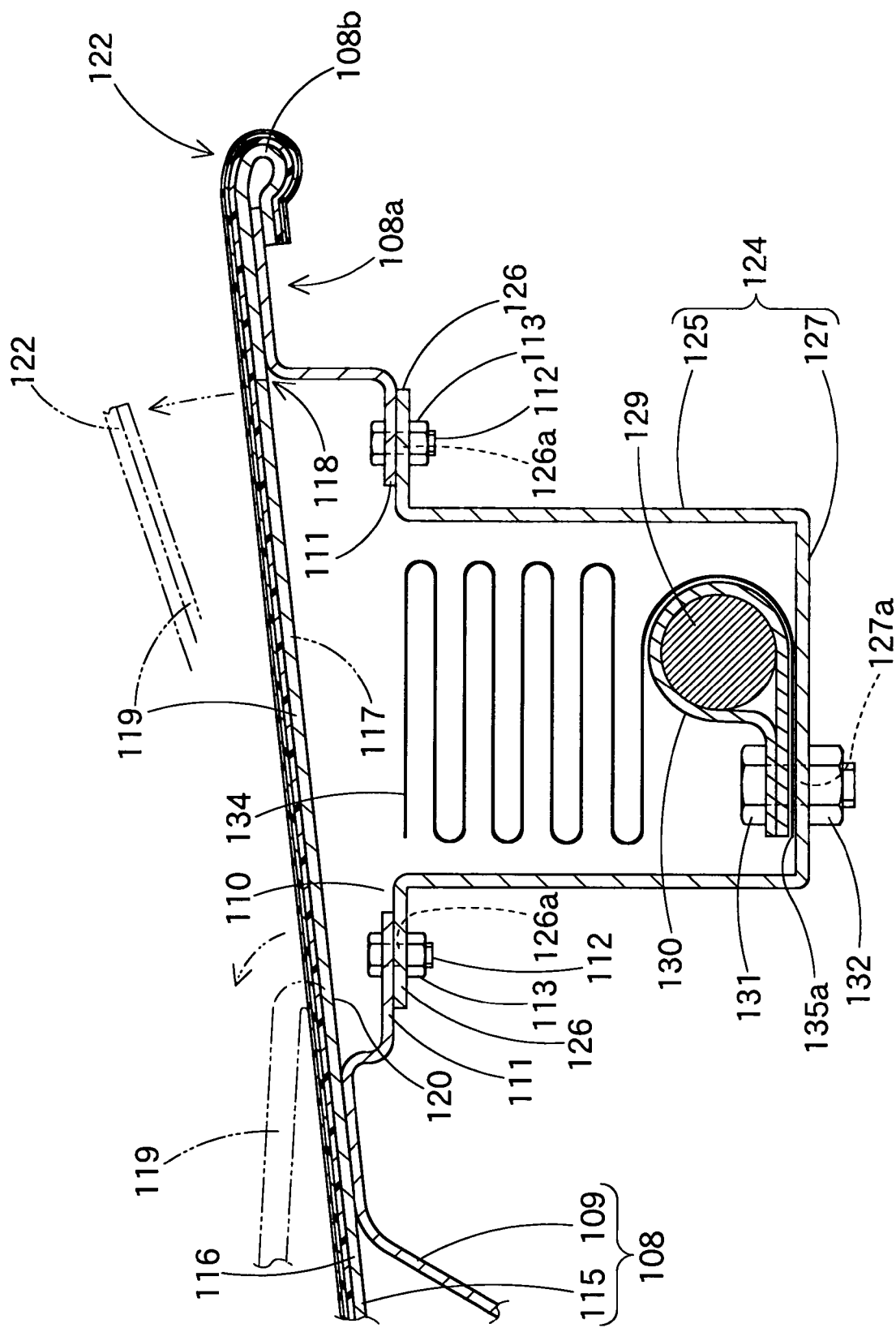
FIG. 18 is a partial enlarged view of FIG. 17.
Figure 19:
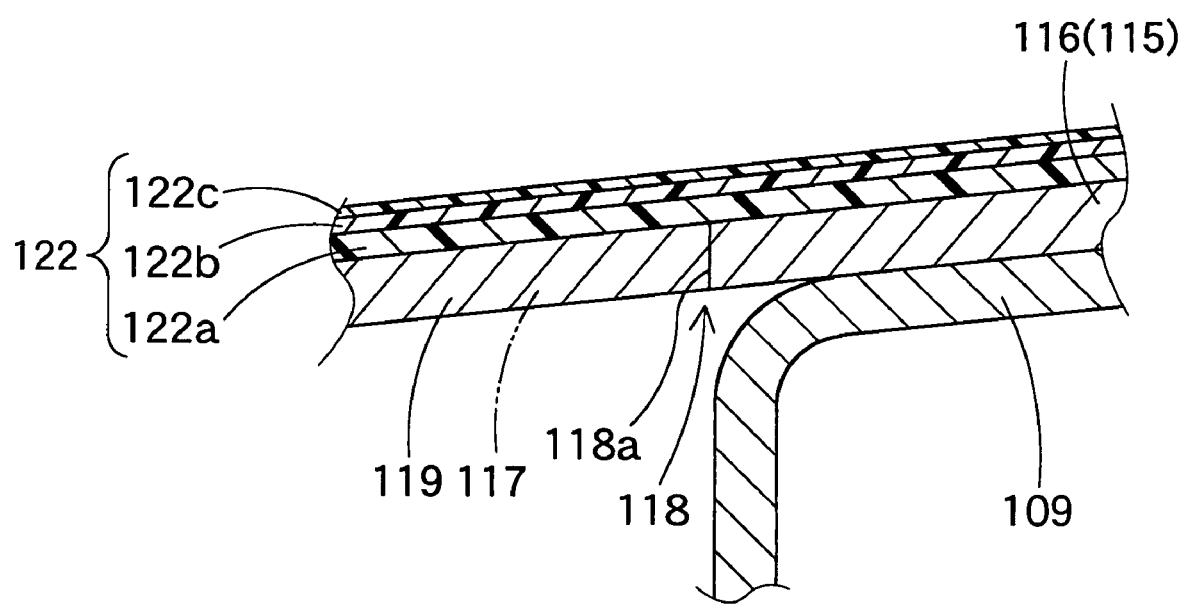
FIG. 19 is a partial enlarged view of a portion near a separation line of the outer panel in the pedestrian airbag system according to the fifth embodiment shown in FIG. 16.

A pedestrian airbag system M5 according to a fifth embodiment is mounted to the side of a rear portion 108*a* of a hood panel 108 of the vehicle V, which is formed of sheet metal, as shown in FIG. 16 to FIG. 18. The airbag system M5 includes an airbag 134, inflators 129 for supplying inflation gas to the airbag 134, a case 124 for accommodating the folded airbag 134 and the inflators 129, and a flap portion 119 opened by being pressed by the airbag 134.

The vehicle V is provided with a sensor, not shown, which can detect or predict collision with a pedestrian on a front bumper 105 as in the first embodiment. When an airbag activating circuit, not shown, supplies a signal detecting the collision with the pedestrian from the sensor, not shown, the inflators 129 are activated. Consequently, the airbag 134 is deployed and inflated by inflation gas injected from the inflators 129.

In addition, the hood panel 108, being formed of sheet metal such as aluminum (aluminum alloy) which can be bent and deformed, includes an outer panel 115 on the side of the upper surface, and an inner panel 109 located on the side of the lower surface and having a higher strength than the outer panel 115, as shown in FIG. 16 to FIG. 18. The hood panel 108 is of a front-opened type, in which the portions of the lateral edges near the rear edge 108*b* are connected to and supported by the body 101 of the vehicle V via hinged portions, not shown.

The inner panel 109 is formed with a placement hole 110 having a substantially rectangular shape and penetrating through in the vertical direction. The peripheral edge of the placement hole 110 extends roughly horizontally as a mounting seat 111 for fixing the case 124 to a downward step of the outer panel 115. The placement hole 110 is curved toward the front at the lateral center thereof so as to extend along the rear edge 108b of the hood panel 108 when viewed from above. The mounting seat 111 is provided with a plurality of bolts 112 extending downward aligned with the sides of the placement holes 110. The respective bolts 112 mount and fix the case 124 to the inner panel 109 by being passed through mounting holes 126a of the fixing strip 126 of the case 124 and being tightened to nuts 113.

The outer panel 115 is adapted to be bent more easily when colliding with a pedestrian than the inner panel 109, and is formed integrally with the flap portion 119 in the case of the fifth embodiment. In other words, in the case of the fifth embodiment, part of the outer panel 115 itself constitutes the flap portion 119, and the portion therearound is a general positioning portion 116 of the outer panel 115.

The flap portion 119 is disposed at the boundary with the general positioning portion 116 with a separation line 118 and a hinge portion 120. The flap portion 119 opens about the hinge portion 120 as a center of revolution when the separation line 118 is separated. When the flap portion 119 is separated from the general positioning portion 116, an opening 117 for allowing the airbag 134 to project is formed in the general positioning portion 116.

The shape of the flap portion 119 in plan view is a curved rectangular plate shape with the lateral center portion projected toward the front and extending along the rear edge 108b of the hood panel 108. The separation line 118 is provided around the flap portion 119. The separation line 118 extends from the rear edge of the flap portion 119 along the left and right edges toward the center of the front edge, and stops at terminals 118d (see FIG. 16). The front edge portion (the portion between the terminals 118d, 118d) of the flap portion 119 where the separation line 118 is not provided corresponds to the hinge portion 120. The flap portion 119 in this embodiment is slightly smaller than the contour along the outer edge of the mounting seat 111 of the inner panel 109.

In the case of the fifth embodiment, the separation line 118 is formed so that the flap portion 119 and the general positioning portion 116 therearound on the side of the outer surface are flush with each other, and is provided with a narrow slit 118a formed by laser processing between the flap portion 119 and the general positioning portion 116. The hinge portion 120, being capable of flexible and plastic deformation, has substantially the same thickness as the general positioning portion 116 or the flap portion 119 so as to allow the flap portion 119 to open. The hinge portion 120 may be reduced in thickness continuously or discontinuously to an extent that does not cause breakage in order to facilitate its flexible and plastic deformation.

In the case of the fifth embodiment, the outer surfaces of the general positioning portion 116 and the flap portion 119 are coated by a continuous coating film 122. The coating film 122 is the same as the normal coating film to be coated on the outer surface of the outer panel of the vehicle, and includes a base layer 122a including an intermediate coating, a design layer 122b for providing design such as metallic gloss or body color on the hood panel 108 using the mica, alumina, color painting or the like, and a top clear layer 122c.

The case 124 is disposed on the lower surface side of the flap portion 119, and as shown in FIGS. 17, 18, is substantially box formed of sheet metal. The case 124 includes a side wall portion 125 opening on top and substantially comprising a square tube extending roughly in the vertical direction, and a bottom wall portion 127 disposed so as to close the lower end of the side wall portion 125.

The bottom wall portion 127 of the case 124 is slightly smaller than the placement hole 110 of the inner panel 109 in plan view, and is curved so as to project at the lateral center toward the front when viewed from above and so as to extend along the rear edge 108b of the hood panel 108. The bottom wall 127 is provided with a plurality of mounting holes 127a for inserting bolts 131 for mounting the inflators 129.

The side wall portion 125 of the case 124 is formed substantially into a square tube extending upward from the peripheral edges of the bottom wall portion 127, and is formed into a shape which is surrounded by the mounting seat 111 along the peripheral edge of the placement hole 110 of the inner panel 109 on four directions of front, rear, left and right. The side wall portion 125 is provided at the upper end thereof with the fixing strip 126 which extends outward like a flange for fixing the case 124 to the inner panel 109. The fixing strip 126 is formed with mounting holes 126a through which the bolts 112 secured to the mounting seat 111 can be inserted so as to extend in the vertical direction. As described above, by inserting the respective bolts 112 into the mounting holes 126a and securing with the nuts 113, the case 124 is mounted and fixed to the inner panel 109.

The inflators 129 are disposed at two positions of left and right sides of the bottom wall portion 127, and retained by brackets 130, respectively. The respective inflators 129 are mounted and fixed to the bottom wall portion 127 of the case 124 by fixing the brackets 130 to the bottom wall portion 127 of the case by the use of the bolts 131 which are passed through the mounting holes 127a and tightened with nuts 132.

The airbag 134 is deployed and inflated by being supplied with inflation gas injected from the inflators 129, and is formed into a bag shape using textile fabric of polyester yarn or polyamide yarn or the like. The airbag 134 when it is completely inflated is substantially in a U-shape which is wide in the lateral direction when viewed from the front as shown by a chain double-dashed line in FIG. 16. In other words, the airbag 134 after having inflated completely includes main body portion 135 disposed along the lateral direction and pillar cover portions 136, 136 extending from the left and right ends of the main body portion 135 rearward so as to cover the front surfaces of the front pillars 4, 4. The main body portion 135 covers substantially the entire length in the lateral direction over the area from the upper surface of the hood panel 108 near the rear portion 108a thereof to the lower portion of the front wind shield 3 when the airbag 134 is completely inflated.

A cowl 102 including a cowl panel 102a, and a cowl louver 102b disposed above the cowl panel 102a is disposed between the hood panel 108 and the front wind shield 3. Therefore, the main body portion 135 of the airbag 134 covers substantially the entire upper surface of the rear portion 108a of the hood panel 108 and the cowl 102 when the inflation is completed.

The main body portion 135 is provided with a connecting port, now shown, connected to the respective inflator 129, and a plurality of mounting strips 135a. The respective mounting strips 135a mounts and fixes the airbag 134 to the bottom wall portion 127 of the case 124 by being fastened to the case 124 with the bracket 130.

In the case of the pedestrian airbag system M5 according to the fifth embodiment, the airbag 134 is folded and the folded airbag 134 is wrapped with a wrapping material for preventing the folded airbag from loosing the shape. Subsequently, the inflators 129, 129 are connected to the airbag 134, and the inflators 129 and the airbag 134 are fixed to the bottom wall portion 127 of the case 124 using the bracket 130, the bolts 131, and the nuts 132, so that the airbag module including the inflators 129 and the airbag 134 accommodated in the case 124 can be assembled.

Then, by mounting and fixing the airbag module to the inner panel 109 of the hood panel 108 which is assembled to the body 101 side by inserting the respective bolt 112 into the mounting holes 126*a* and tightening the nuts 113 to the respective bolts 112, the pedestrian airbag system M5 can be mounted to the vehicle. The coating film 122 is provided on the hood panel 108 via the coating process in the process of manufacturing the vehicle V.

When mounting the airbag module to the inner panel 109, the airbag module is mounted first in a state in which the hood panel 108 provided with the coating film 122 is removed from the vehicle V, and then the hood panel 108 including the airbag module assembled thereto is mounted to the vehicle. If there is no problem, it is also possible to mount the airbag module to the inner panel 109 of the hood panel 108 in a stage before forming the coating film 122.

When mounting the pedestrian airbag system M5 to the vehicle V, a lead wire for supplying operating signal from the airbag activating circuit, not shown, is connected to the inflators 129 side.

Figure 20:
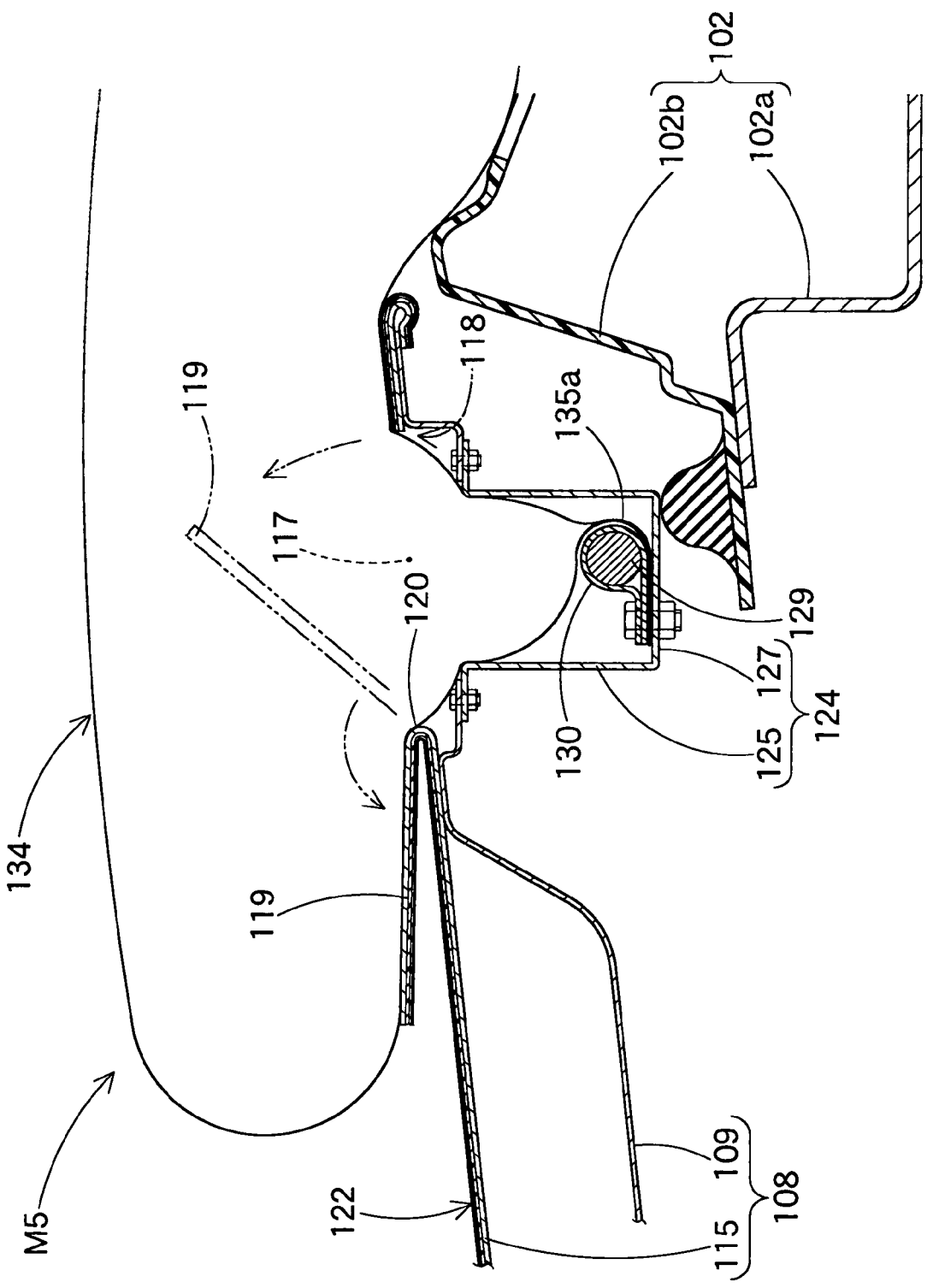
FIG. 20 is a schematic vertical cross-sectional view showing the pedestrian airbag system according to the fifth embodiment shown in FIG. 16 during operation.

According to the pedestrian airbag system M5 of this embodiment, in the state of being mounted to the vehicle, when the operating signal is supplied from the airbag activating circuit to the inflators 129, 129, inflation gas is injected from the respective inflators 129, and the airbag 134 is inflated by being supplied with inflation gas. Then, the flap portion 119 is pushed by the airbag 134, moves away from the general positioning portion 116 at the position of the separation line 118 while breaking the coating film 122 at the separation line 118, and opens toward the front about the hinge portion 120, which is bent and plastically deformed as the center of rotation, thereby opening the opening 117 for projection. Accordingly, the airbag 134 projects upward from the opening 117 for projection, and completes inflation as shown by a solid line in FIG. 20 or a chain double-dashed line in FIG. 16.

Then, in the pedestrian airbag system M5 in the fifth embodiment, the outer surfaces of the general positioning portion 116 and the flap portion 119 of the outer panel 115 are flush with each other, and are coated by the same continuous coating film 122. Therefore, the break at the boundary between the flap portion 119 and the surrounding general positioning portion 116 can hardly be seen, whereby design of the hood panel 108 around the mounting portion is improved.

The flap portion 119 is formed of the same metallic material as the surrounding general positioning portion 116 of the outer panel 115. Therefore, even when the flap portion 119 is affected by heat, since the coefficient of expansion is the same as that of the surrounding general positioning portion 116, no distortion occurs, and hence design of the mounting portion is not deteriorated.

As a matter of course, when the airbag 134 is inflated, the flap portion 119 rises, causing the separation line 118 at the boundary portion of the outer panel 15 with respect to the general positioning portion 116 to be separated with the hinge portion 120 as the center of rotation, and the opening 117 for projection is formed. Therefore, the airbag 134 can be projected from the opening 117 for projection so as to be capable of protecting the pedestrian without problem.

Therefore, in the pedestrian airbag system M5 according to the fifth embodiment, design of the hood panel 108 at the mounting portion can be improved.

In the fifth embodiment, the case 124 for accommodating the folded airbag 134 is disposed on the side of the lower surface of the flap portion 119. The inner panel 109 which is secured to the portion on the outer panel 115 near the separation line 118 is provided with the mounting seat 111 for fixing the fixing strip 126. The fixing strips 126 of the case 124 are connected to the portion of the outer panel 115 near the separation line 118 via the mounting seat 111.

In this arrangement, the case 124 has rigidity so as not to be deformed even when a reaction force from the projecting airbag 134 is exerted thereto. Therefore, since the portion of the outer panel 115 near the separation line 118 is connected to the rigid case 124 via the mounting seat 111, deformation of the outer panel 115 at the peripheral edge of the opening 117 is controlled when the airbag 134 is deployed and inflated, whereby the pressing force of the airbag 134 can be concentrated to the flap portion 119. Consequently, the flap portion 119 can be opened quickly, and hence quick deployment and inflation of the airbag 134 is promoted.

In the fifth embodiment, the separation line 118 is formed by providing the narrow slit 118*a* for separating the general positioning portion 116 and the flap portion 119 from the beginning. However, as in a pedestrian airbag system M6 according to a sixth embodiment shown in FIG. 21, it is also possible to form the separation line 118 by providing a wide slit 118*b* which allows the base coat layer 122*a* of the coating film 122 to enter therein. Alternatively, as in a pedestrian airbag system M7 according to a seventh embodiment shown in FIG. 22, the separation line 118 can be formed by cutting a plate material of the same metal material as the outer panel 115 separately from the outer panel 115 to form the flap portion 119A, and then disposing the flap portion 119A so as to abut against the edge portion of the surrounding outer panel 115 at the opening 117. The flap portion 119A is formed of the metal plate of aluminum alloy or the like which is the same material as the outer panel 15.

Also, as shown in FIG. 23, the separation line 118 can be formed of thinned portion provided with continuous or discontinuous recessed grooves 118*c* so as to be broken and separate from the general positioning portion 116 of the outer panel 115 when pressed by the airbag.

When providing a slit 118*b* of a relatively wide gap as the separation line 118, the material or the thickness of the coating film 122 is preferably taken into account to eliminate the influence of the slit 118*b* to the outer surface of the coating film 122.

When the outer surfaces of the flap portion 119 and the portion of the outer panel 115 therearound (the general positioning portion 116) are formed into flush with each other, the flat plane design can be improved. However, it is also possible to provide a step including a recessed groove or a projecting ridge or the like near the peripheral edge of the flap portion 119 to improve design. In this case as well, design of the mounting portion can be improved as long as the coating film 122 over the flap portion 119 and the portion of the outer panel 115 around the flap portion is continuous.

In the case of the separation line 118 of a breakaway type shown in FIG. 23, in which the flap portion 119 is opened by breaking the boundary portion between the general positioning portion 116 of the outer panel 115 and the flap portion 119 when being pressed by the airbag 134, it is preferable to connect the case 124 and the portion of the general positioning portion 116 of the outer panel 115 near the separation line 118 via a mounting seat 111 as in the fifth embodiment. This is because unnecessary deformation of the general positioning portion 116 can be prevented to cause smooth breakage of the breakaway portion (separation line) 118, whereby quick deployment of the airbag 134 is achieved.

Figure 21:
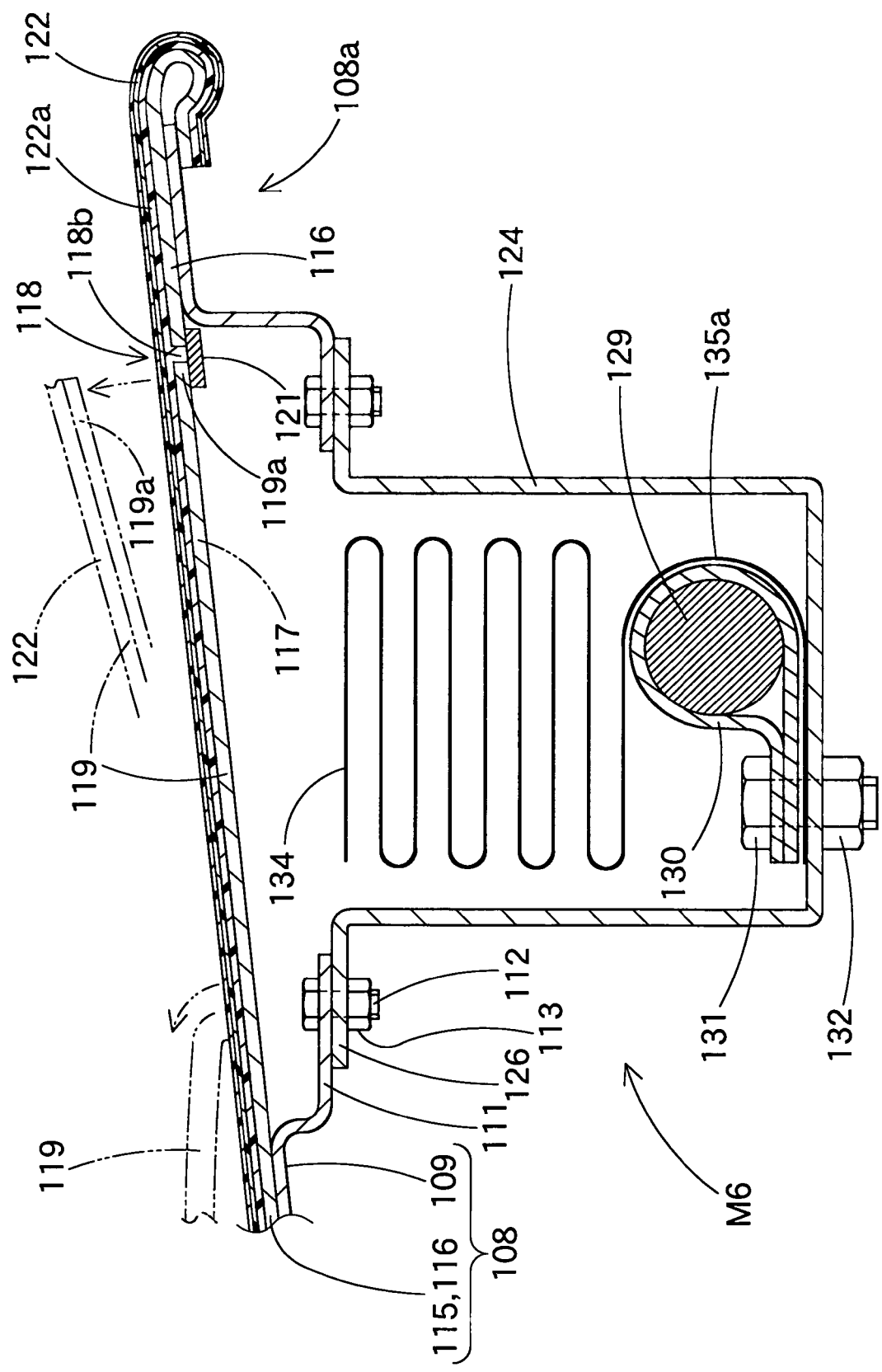
FIG. 21 is a schematic cross-sectional view showing a pedestrian airbag system according to a sixth embodiment.

In the case of the flap portion 119 which is adjacent to the separation line 118 being configured by the slits 118a, 118b, or the flap portion 119A which is a member separate from the outer panel 115, a supporting strip 121 for supporting the lower side of the outer peripheral edge 119a on the side of the outer panel 115 of the opening periphery 115a may be provided so as to prevent the outer peripheral edge 119a from dropping downward. The supporting strip 121 can be prepared as a separate member from the outer panel 115, as shown in FIG. 21, and disposed by welding or bonding to the outer panel 115, or may be formed integrally with the outer panel 115 as shown in FIG. 22.

Figure 22:
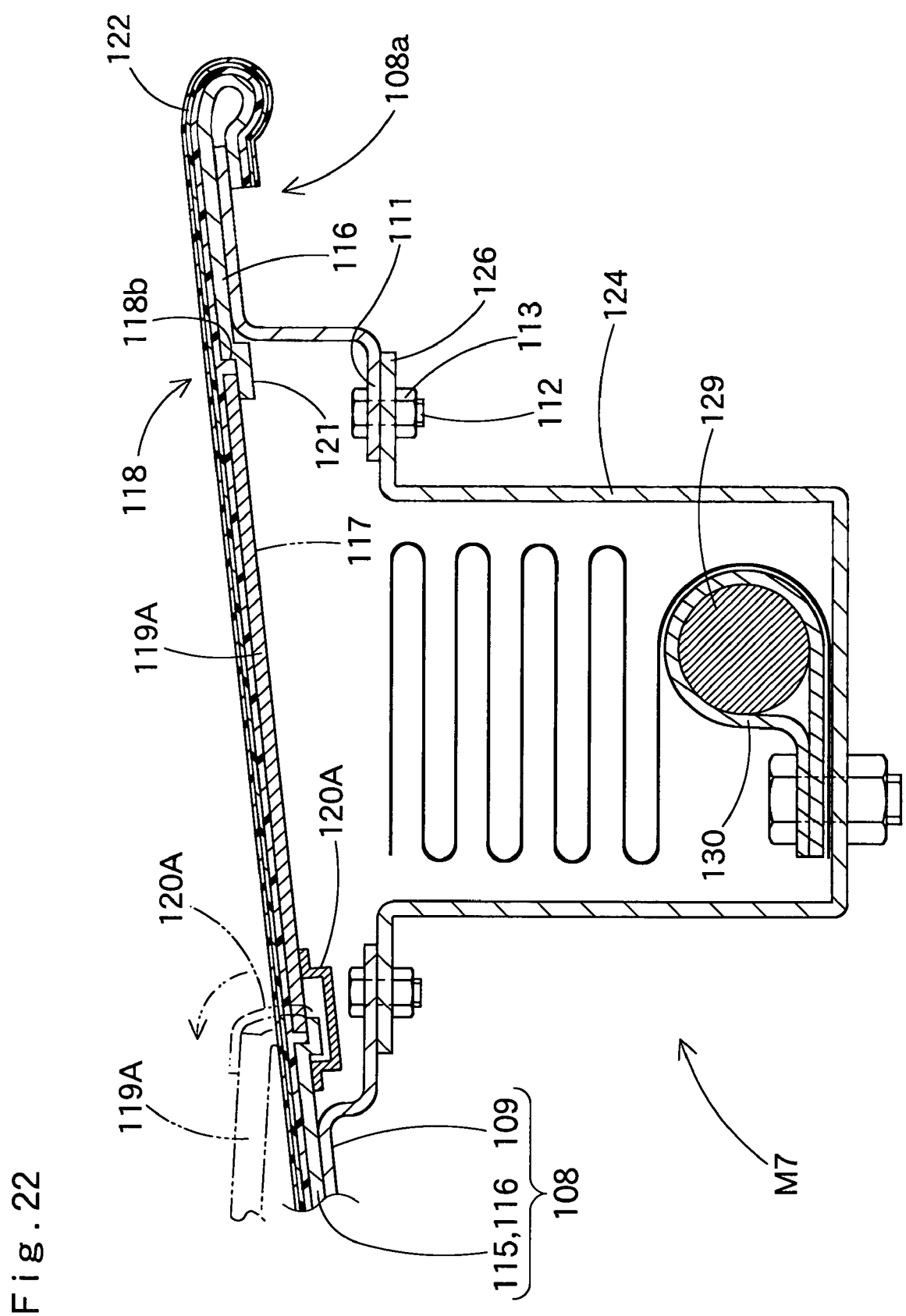
FIG. 22 is a schematic vertical cross-sectional view showing a pedestrian airbag system according to a seventh embodiment.

The hinge portion 120 can be formed integrally with the outer panel 115 so as to be bent and plastically deformed when the flap portion 119 is opened as in the fifth embodiment, or alternatively, the hinge portion can be formed by joining the bendable and deformable hinge member 120A to the outer panel 115 and the flap portion 119A so as to straddle therebetween, as in the seventh embodiment shown in FIG. 22. The hinge member for joining the outer panel 115 and the flap portion 119A so as to straddle therebetween is not limited to the hinge member 120A which can be bent and plastically deformed by itself as shown in FIG. 22, and a hinge member which can support the flap portions 119, 119A rotatably such as a double-leaf hinge butt be used.

In addition, in the example of the fifth embodiment, the portion of the hood panel 108 is the mounting position of the pedestrian airbag system M5. However, the pedestrian airbag system M5 in the fifth embodiment can be mounted to the door portion, the front fender portion, or the roof portion as long as it is a portion of the outer panel exposed to the outside of the vehicle.

A pedestrian airbag system M8 according to an eighth embodiment, as shown in FIG. 24 to FIG. 27, includes a hood panel 213, an air bag 240 disposed on the lower side of the hood panel 213 near the rear end thereof, inflators 235 for supplying inflation gas to the airbag 240, and a case 226 for accommodating the folded airbag 240 and the inflators 235.

The hood panel 213 is disposed so as to cover the upper side of the engine room, not shown, in the vehicle V. The hood panel 213 is connected to a body 201 of the vehicle V using hinges, not shown, at positions of the left and right edges near the rear edge 213a, and opens and closes on the front side. The hood panel 213 is formed of aluminum (aluminum alloy) and includes an outer panel 214 on the side of the upper surface and an inner panel 215 disposed on the side of the lower surface of the outer panel 214. The hood panel 213 is curved on the rear edge 213a side so as to project at the lateral center portion toward the front. Provided rearwardly of the hood panel 213 at the position between the hood panel 213 and the front wind shield 210 is a cowl 206 including a cowl panel 208 and a cowl louver 207 disposed upwardly of the cowl panel 208.

Figure 25:
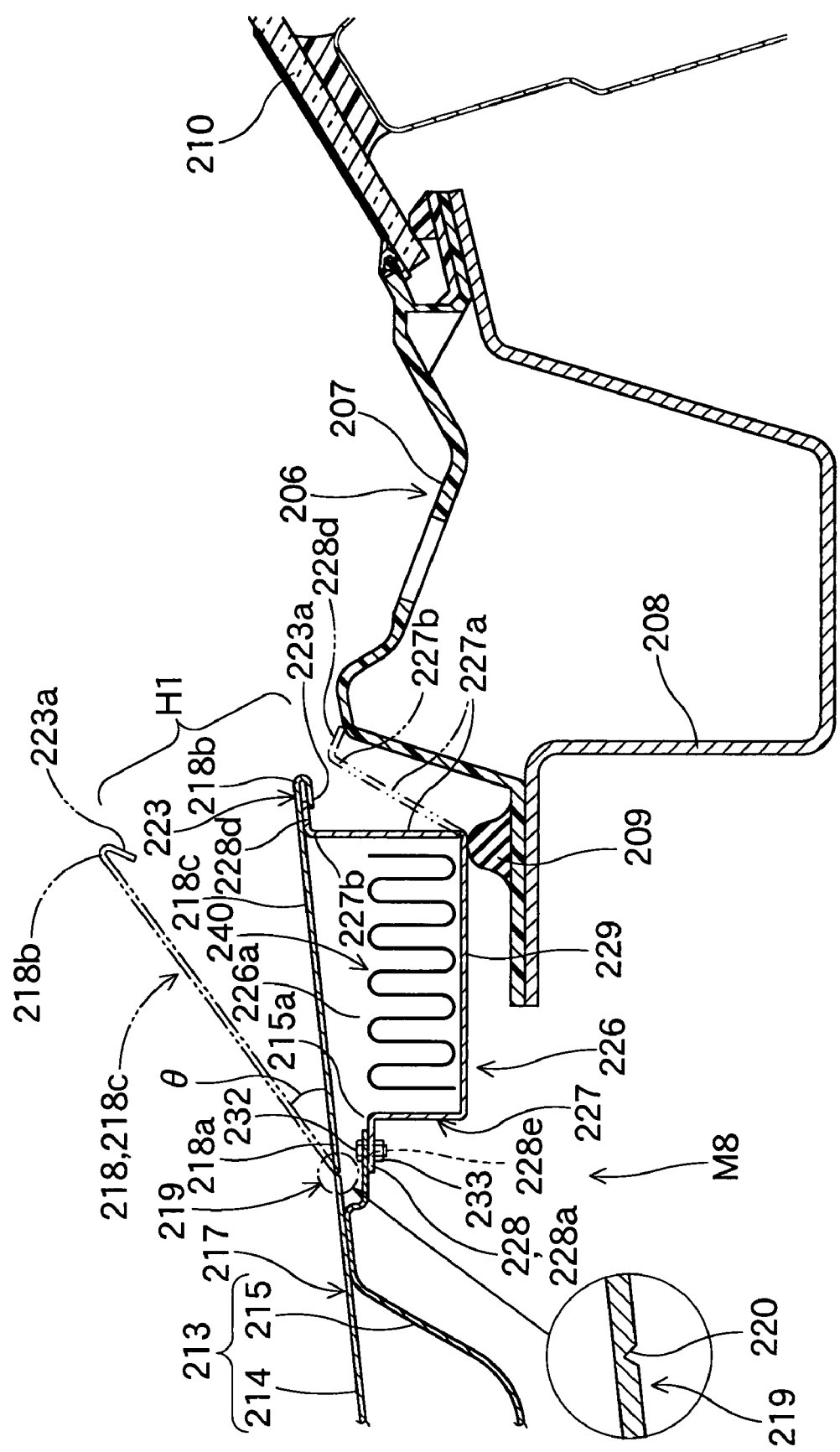
FIG. 25 is a schematic cross-sectional view of the pedestrian airbag system according to the eighth embodiment shown in FIG. 24 taken along the longitudinal direction of the vehicle, which corresponds to the portion along XXV-XXV in FIG. 24.
Figure 26:
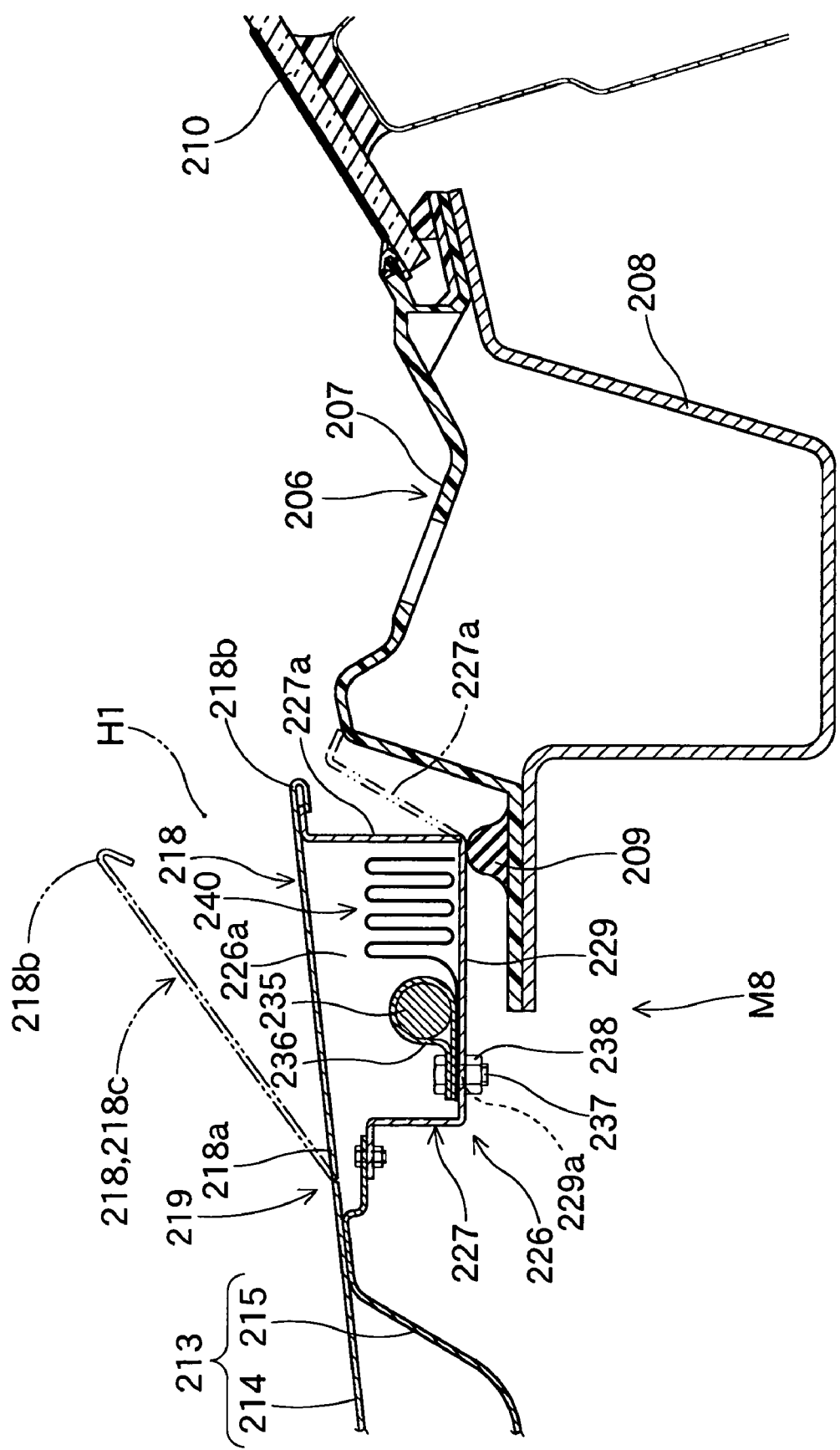
FIG. 26 is a schematic cross-sectional view of the pedestrian airbag system according to the eighth embodiment shown in FIG. 24 taken along the fore-aft-direction of the vehicle, which corresponds to the portion along XXVI-XXVI in FIG. 24.
Figure 27:
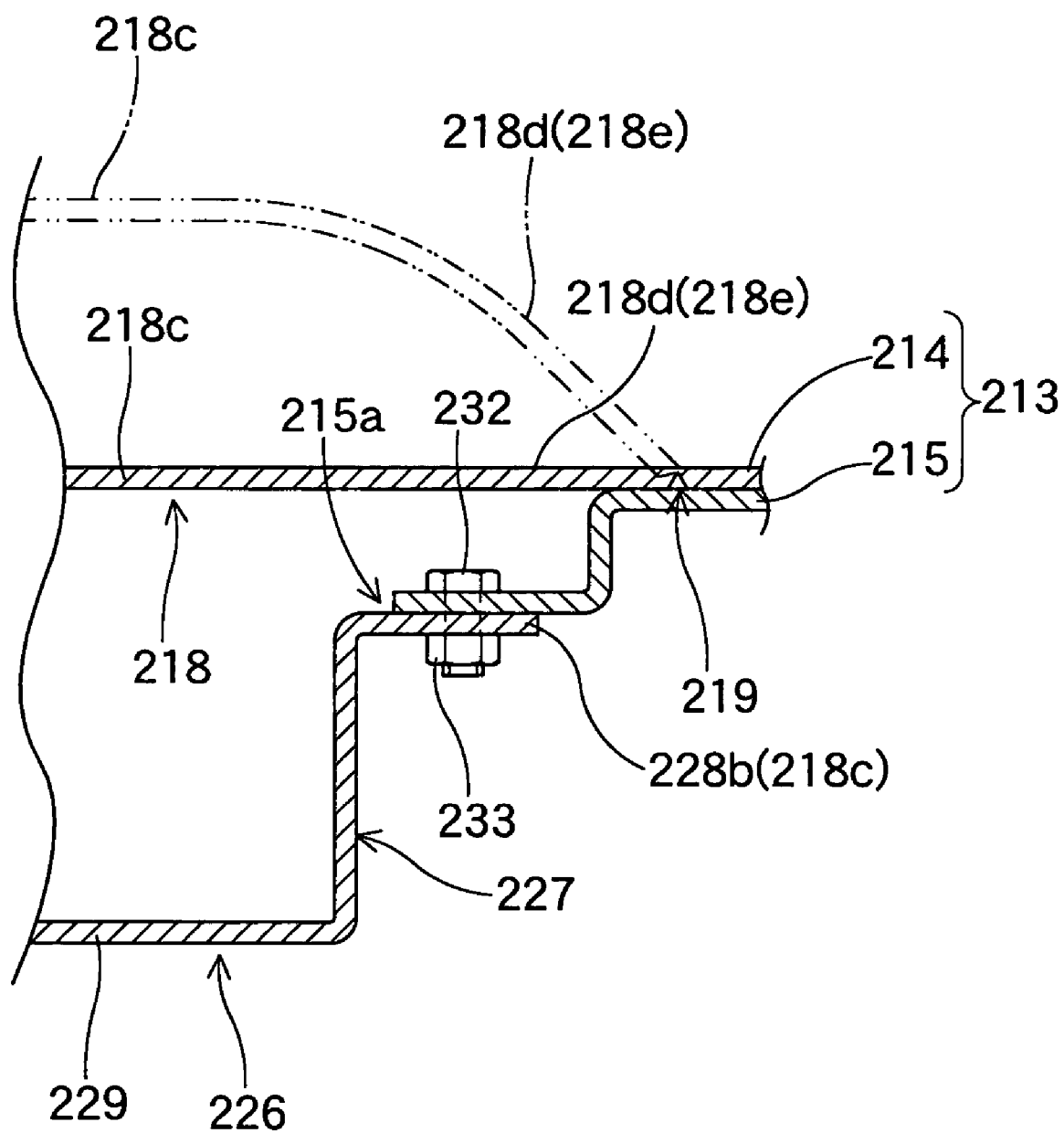
FIG. 27 is a schematic cross-sectional view of the pedestrian airbag system according to the eighth embodiment shown in FIG. 24, showing a portion near the lateral ends of the case and a flap portion.
Figure 28:
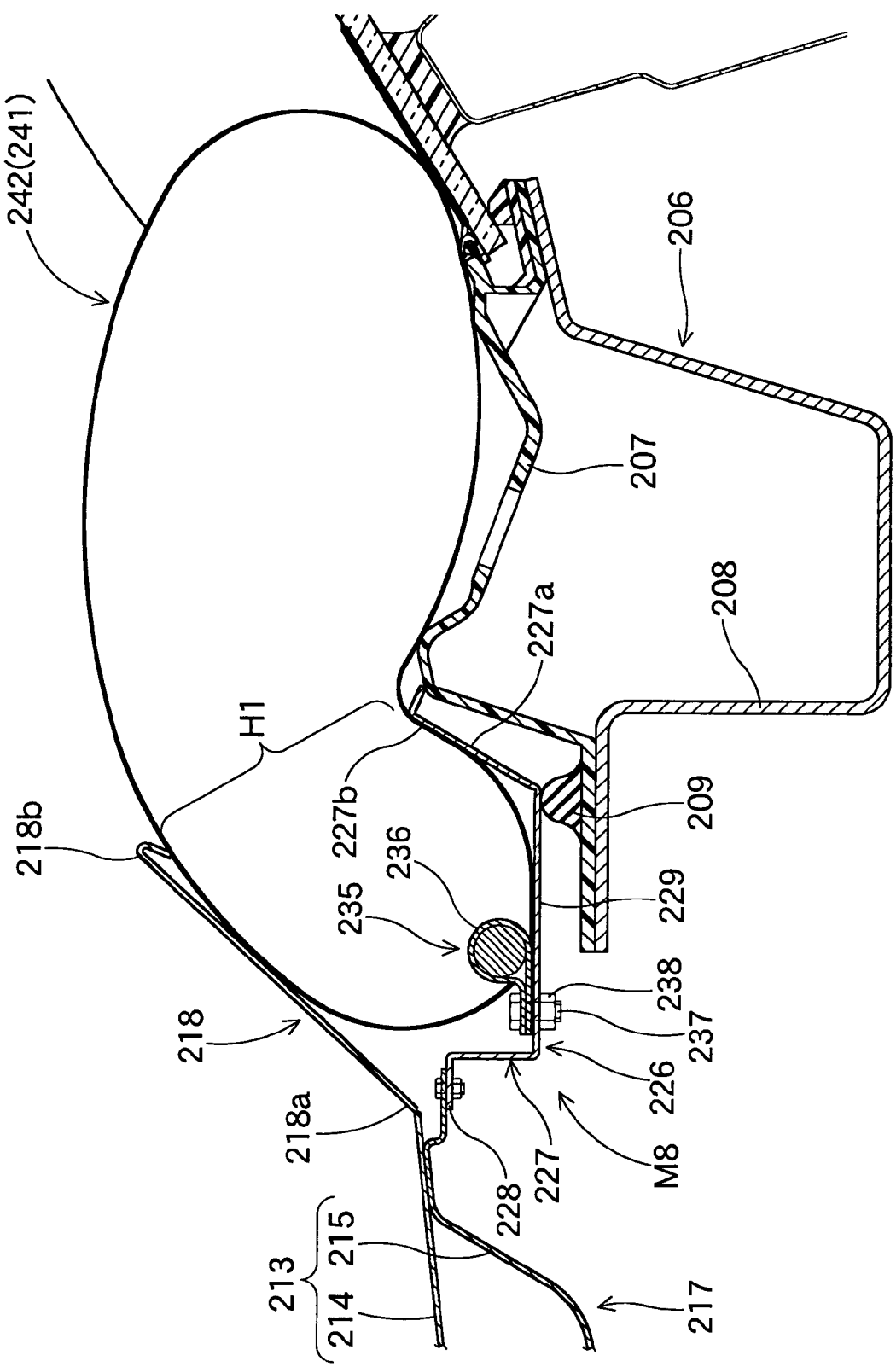
FIG. 28 is a schematic cross-sectional view of the pedestrian airbag system according to the eighth embodiment shown in FIG. 24 showing a state in which the airbag is completely inflated.

The hood panel 213 includes a main panel 217 for covering the upper side of the engine room and a flap portion 218. The flap portion 218 is disposed at a portion to the rear of the main panel 217 (on the side of the rear edge 213a of the hood panel 213), is formed integrally with the main panel 217, and covers the upper side of the case 226. In the case of the eighth embodiment, the flap portion 218 includes only the outer panel 214 as shown in FIGS. 25 to 27. The inner panel 215 is cut out at its rear to the position where the flap portion 218 is located so as to be capable of accommodating the case 226.

Figure 24:
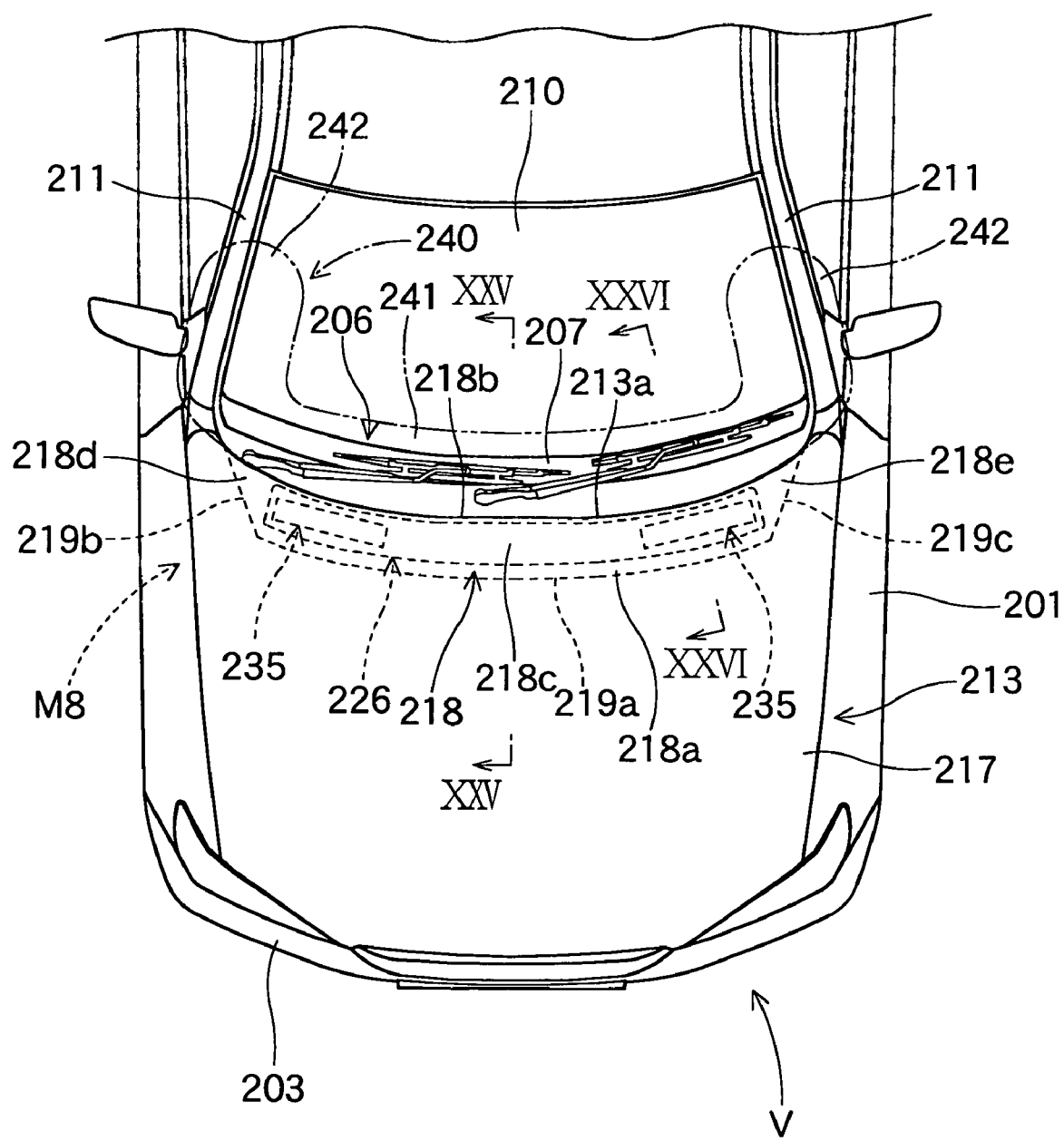
FIG. 24 is a plan view of a vehicle on which a pedestrian airbag system according to an eighth embodiment.

The flap portion 218 is disposed substantially over the entire hood panel 213 in the lateral direction so as to be able to cover the opening 226a of the case 226. A hinge portion 219 is disposed on the front edge 218a side of the flap portion 218. The hinge portion 219 is formed by providing a recess groove 220 formed continuously or discontinuously cut out from the lower surface side of the outer panel 214. The flap portion 218 opens when the airbag 240 is deployed and inflated, bending and deforming the periphery of the recess groove 220, and the rear edge 218b of the flap portion is moved upward. The recess groove 220 is substantially in a V-shape in cross section in the case of the eighth embodiment, and is formed by press work or cutting work. The hinge portion 219 (recess groove 220) is disposed at a position forwardly of the case opening 226a of the case 226, as shown in FIGS. 24 to 26. The hinge portion 219 (recess groove 220) is disposed at the front portion of the case 226 (a front portion 219a), so as to project at the lateral center toward the front along with the case 226, and at the portions which are located on the left and right sides of the case 226 (left and right portions 219b, 219c), disposed into a tapered shape opening backward so as to connect the end of the front portion 219a and the portion near the rear edge 213a of the hood panel 213, respectively. Therefore, in the case of the eighth embodiment, the flap portion 218 is formed to be in a substantially trapezoidal shape which is wider on the vehicle rear side when viewed from above.

On the rear edge 218b side of the flap portion 218, there are provided engaging portions 223 for fixing the flap portion 218 to the case 226 side at a plurality of positions along the lateral direction. The respective engaging portions 223 are curved at the distal end sides 223a toward the front. The engaging portions 223 are engaged with a flange portion 228 projecting rearward from an upper end 227b of a rear wall portion 227, described later (rear side portion 228d), of the case 226. When the airbag 240 is supplied with inflation gas flowing therein and is inflated so as to push the flap portion 218 upward, the respective engaging portions 223 are deformed and release the engaging state with respect to the rear side portion 228d.

In the eighth embodiment, the hinge portions 219b, 219c are disposed obliquely with respect to the rear edge 218b, and is disposed on the front of the left and right side portions 218d, 218e of the case 226. These portions 218d, 218e are not broken when the airbag 240 is deployed and inflated, and open the flap portion 218 while stretching the portion near the hinge portions 219b, 219c. In other words, the left and right side portions 218d, 218e at the flap portion 218 cause the flap portion 218 to open so that the vertical opening distance of the flap portion 218 is decreased toward the left and right ends as shown by chain double-dashed line in FIG. 27, whereby the flap portion 218 does not open largely upward when the airbag 240 is deployed and inflated. Therefore, in the eighth embodiment, although a portion 218c located on the upper side of the case opening 226a is pressed upward by the airbag 240 which is supplied with inflation gas flowing therein, the left and right portions 218d, 281e serve as stoppers. Consequently, the portion 218c is prevented from opening largely so that the rear edge 218b is directed upward. In the case of the eighth embodiment, the flap portion 218 is set to open by an opening angle θ (see FIG. 25) within the range of 15° to 45°.

The case 226 is formed of aluminum (aluminum alloy), and, as shown in FIG. 24, and the lateral width thereof is smaller than the lateral width of the hood panel 213. The case 226 is curved so as to project at the lateral center thereof toward the front along the rear edge 213a of the hood panel when viewed from above. In the case of the eighth embodiment, the case 226 is substantially in a box-shape and includes a side wall portion 227 which is substantially a square tube which opens at the top and a bottom wall portion 229 disposed so as to close the lower end side of the side wall portion 227. The upper end of the side wall portion 227 is formed with the flange portion 228 which projects toward the front, rear, left and right. The case 226 is fixed to the portion of the inner panel 215 peripheral edges formed into notches 215a via the front portion 228a and the left and right portions 228b of the flange portion 228 using bolts 232 and nuts 233, and so is also fixed to the hood panel 213 (see FIGS. 25 to 28). The case 226 is supported at its bottom wall portion 229 by the cowl panel 208 via the cowl louver 207 and a seal member 209. The seal member 209 is disposed so as to seal between the cowl louver 207 and the case 226.

The case 226 in the eighth embodiment is formed of aluminum which is subject to plastic deformation, and the upper end 227b side of the rear wall portion 227a is not fixed to the hood panel 213 (inner panel 215). Therefore, when the airbag 240 is deployed and inflated, the rear wall portion 227a is plastically deformed so that the upper end 227b side of the rear wall portion 227a disposed on the rear side of the airbag 240 is moved rearward by being pushed by the airbag 240. In other words, in the case of the eighth embodiment, the rear wall portion 227a is plastically deformed in such a manner that the upper end 227b side is directed rearward about the joint between the rear wall portion 227a and the bottom wall portion 28 as a center of rotation. The rear wall portion 227a is deformed with the upper end side near the lateral center moved rearward to the largest extent.

The inflators 235 are disposed at two positions of the left and right sides of the case 226 as shown in FIG. 24. The inflators 235 are formed substantially into narrow cylinders provided with gas injection ports (not shown). The respective inflators 235 are connected to the airbag 240 so as to be capable of supplying inflation gas into the airbag 240. The inflators 235 are held by brackets 236 formed of sheet metal as shown in FIG. 26, respectively. The respective inflators 235 are mounted and fixed to the case 226 by fixing the brackets 236 to the bottom wall portion 229 of the case 226 using bolts 237 and nuts 238.

Figure 30:
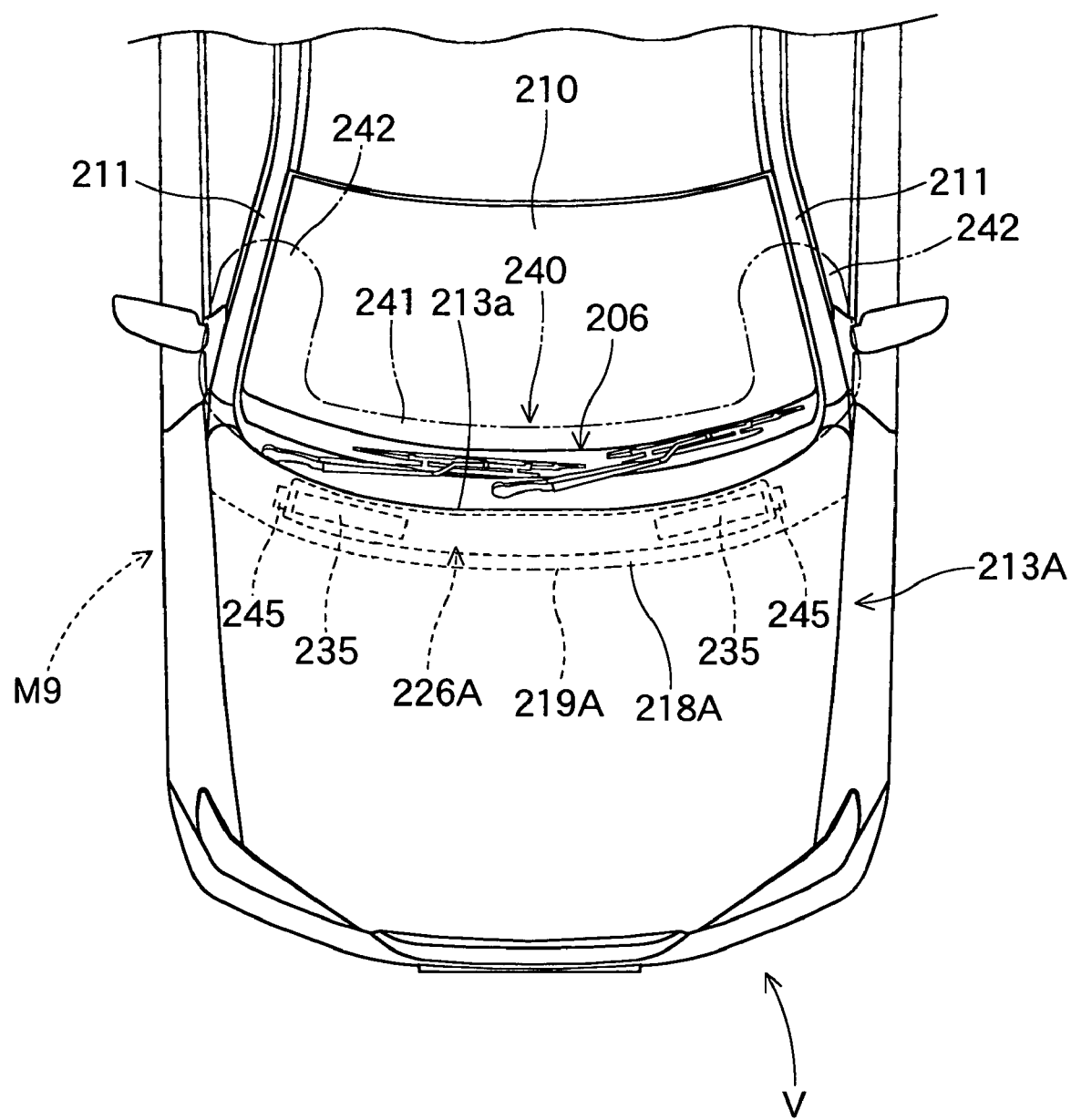
FIG. 30 is a plan view of a vehicle on which a pedestrian airbag system according to a ninth embodiment is mounted.

The airbag 240 are deployed and inflated by being supplied with inflation gas injected from the inflators 235. The airbag 240 is formed into a bag shape using textile fabric of polyester yarn or polyamide yarn or the like. The airbag 240 is mounted and fixed to the case 226 together with the inflators 235 by the use of bolts 237 for fixing the inflators 235 as shown in FIG. 26. The airbag 240 is substantially in a U-shape which is wide in the lateral direction when viewed from the front when it is completely inflated as shown by the chain double-dashed line in FIG. 24 and FIG. 30. In other words, the airbag 240 after having inflated completely includes a laterally inflated portion 241 extending in the lateral direction and vertically inflated portions 242, 242 extending rearward from both left and right ends of the laterally inflated portion 241 so as to cover the front surface side of the front pillars 211. The laterally inflated portion 241 covers substantially the entire length in the lateral direction of the area from the cowl louver 207 to the portion of the front wind shield 210 near the lower front edge when the airbag 240 is completely inflated.

The vehicle V is provided with a sensor, not shown, which can detect or predict collision with a pedestrian on a front bumper 203. When the airbag activating circuit, not shown, supplies a signal detecting the collision with the pedestrian from the sensor, not shown, the inflators 235 are activated.

The pedestrian airbag system M8 according to the eighth embodiment is mounted to the vehicle V as follows. The inflators 235 retained by the brackets 236 are connected to the folded airbag 240. Subsequently, the airbag 240 and the inflator 235 are accommodated in the case 226 from the opening 226a in such a manner that the bolts 237 are projected from the insertion holes 229a of the bottom wall portion 229. Then, nuts 238 are tightened to the bolts 237 projecting from the bottom wall portion 229 of the case, and the inflators 235 and the airbag 240 are mounted and secured to the case 226.

Subsequently, the bolts 232 projecting from the peripheral edge portion of the notches 215a of the inner panel 215 are inserted into the respective insertion holes 228e formed on the flange portion 228 (front, left and right portion 228a, 228b). Simultaneously, the distal end 223a of the engaging portions 223 formed on the side of the rear edge 218b of the flap portion 218 are engaged with the rear side portion 228d of the flange portion 228. Then, by tightening the nuts 233 to the bolts 232 projecting from the flange portion 228, the case 226 can be fixed to the hood panel 213. Subsequently, by fixing the hood panel 213 to the body 201 of the vehicle V using a hinge, not shown, the pedestrian airbag system M8 can be mounted to the vehicle V.

Figure 29:
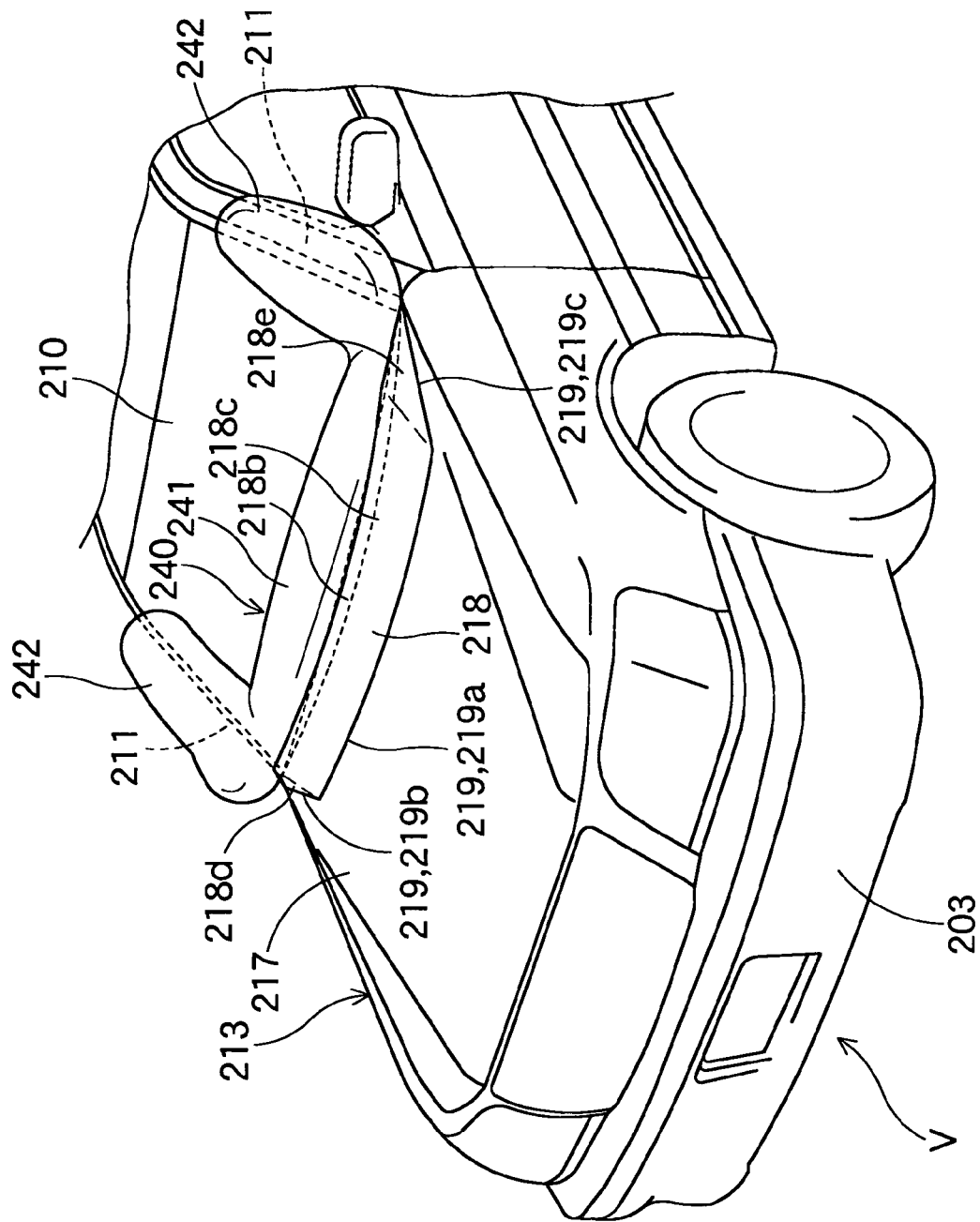
FIG. 29 is a perspective view of the pedestrian airbag system according to the eighth embodiment in FIG. 24 of a vehicle showing a state in which the airbag is completely inflated.

In the pedestrian airbag system M8 according to the eighth embodiment, when the operation signal is supplied to the inflators 235 in the state of being mounted to the vehicle, inflation gas is injected from the inflators 235, and the airbag 240 is inflated while allowing inflation gas to flow therein. Therefore, the flap portion 218 is pushed by the airbag 240 and opens with the rear edge 218b side moving upward while bending and (plastically) deforming the hinge portion 219. Then, the airbag 240 projects from the opened opening H1 rearward and upward, whereby inflation is completed as shown by chain double-dashed line in FIG. 24, and FIGS. 28 and 29.

Then, in the pedestrian airbag system M8 according to the eighth embodiment, the flap portion 218 covering the upper side of the case 226 is formed integrally with the main panel 217 in the hood panel 213 via the plastically deformed hinge portion 219. Therefore, a break between the flap portion 218 and the surrounding main panel 217 does not appear on the side of the front surface of the hood panel 213, and design of the mounting portion of the pedestrian airbag system M8 is improved.

In the pedestrian airbag system M8 according to the eighth embodiment, the flap portion 218 opens so as to move the rear edge 218b side upward by plastically deforming the hinge portion 219 when the airbag 240 is deployed and inflated. Then, since the airbag 240 can project from the opening H1 which is formed at the upper end of the case 226, the airbag 240 is deployed and inflated so as to be capable of protecting the pedestrian without problem.

Therefore, in the pedestrian airbag system M8 according to the eighth embodiment, design of the mounting portion can be improved.

In the pedestrian airbag system M8 according to the eighth embodiment, the case 226 is formed of aluminum. In addition, the case 226 is plastically deformed at the rear wall portion 227a so that the upper end 227b side of the rear wall portion 227a disposed rearwardly of the airbag 240 is moved rearward to broaden the opening H1 on top of the case 226 when the airbag 240 is deployed and inflated. Therefore, the wide opening H1 for causing the airbag 240 to project when the airbag 240 is deployed and inflated can be secured, whereby the airbag 240 can project quickly through the opening H1. In the pedestrian airbag system M8 according to the eighth embodiment, even though the case 226 is formed of aluminum, the case 226 is supported by the cowl panel 208 on the side of the lower surface (bottom wall portion 229 side). Therefore, the case 226 can be prevented from deforming so as to move downward when the airbag 240 is deployed and inflated, whereby the airbag 240 can be stably projected in the desired direction. Therefore, the airbag 240 projects rearward and upward while avoiding collision with wipers, not shown, which are disposed so as to project upward from the cowl louver 207. Therefore, the airbag 240 can be deployed and inflated smoothly.

When these points are not important, a structure in which the rear wall portion 227*a* of the case 226 is not plastically deformed of course is possible. Although the entire case 226 is formed of aluminum in the pedestrian airbag system M8 according to the eighth embodiment, it is also possible, for example to form the case of steel plate or the like, with a weakened rear wall portion 227 which plastically deforms so that the upper end 227*b* side of the rear wall portion 227 moves rearward.

Furthermore, in the pedestrian airbag system M8 according to the eighth embodiment, the opening angle of the flap portion 218 is controlled to be smaller than 90° by controlling the opening angle at the center portion 218*c* by the both left and right ends portions 218*d*, 218*e*. Therefore, it does not move to the extent that the rear edge 218*b* of the opened flap portion 218 faces the front. Consequently, the flap portion 218 structure can protect the pedestrian from the rear edge 218*b* of the flap portion 218. When these points are not important, the flap portion can be configured to be open up larger than 90°.

Figure 31:
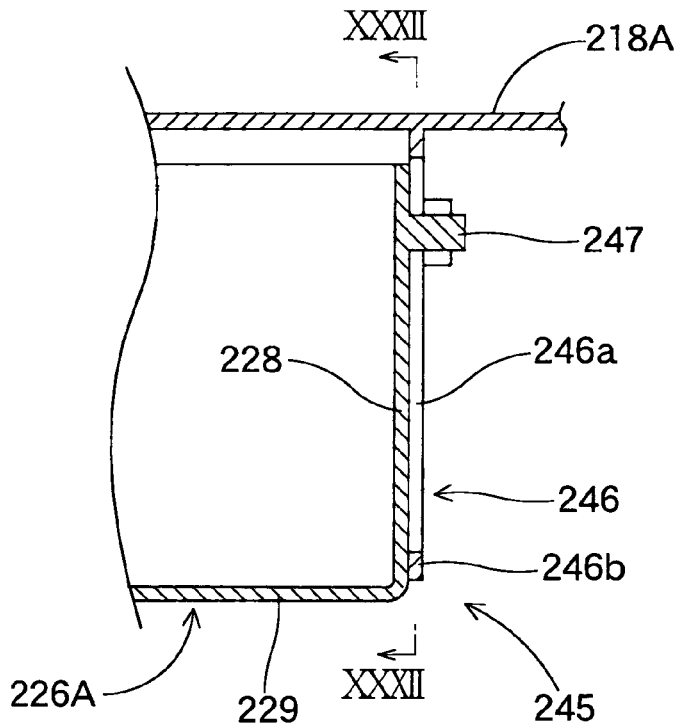
FIG. 31 is a schematic cross-sectional view of the pedestrian airbag system according to the ninth embodiment shown in FIG. 30 showing the portion near the lateral ends of the case and the flap portion.
Figure 32:
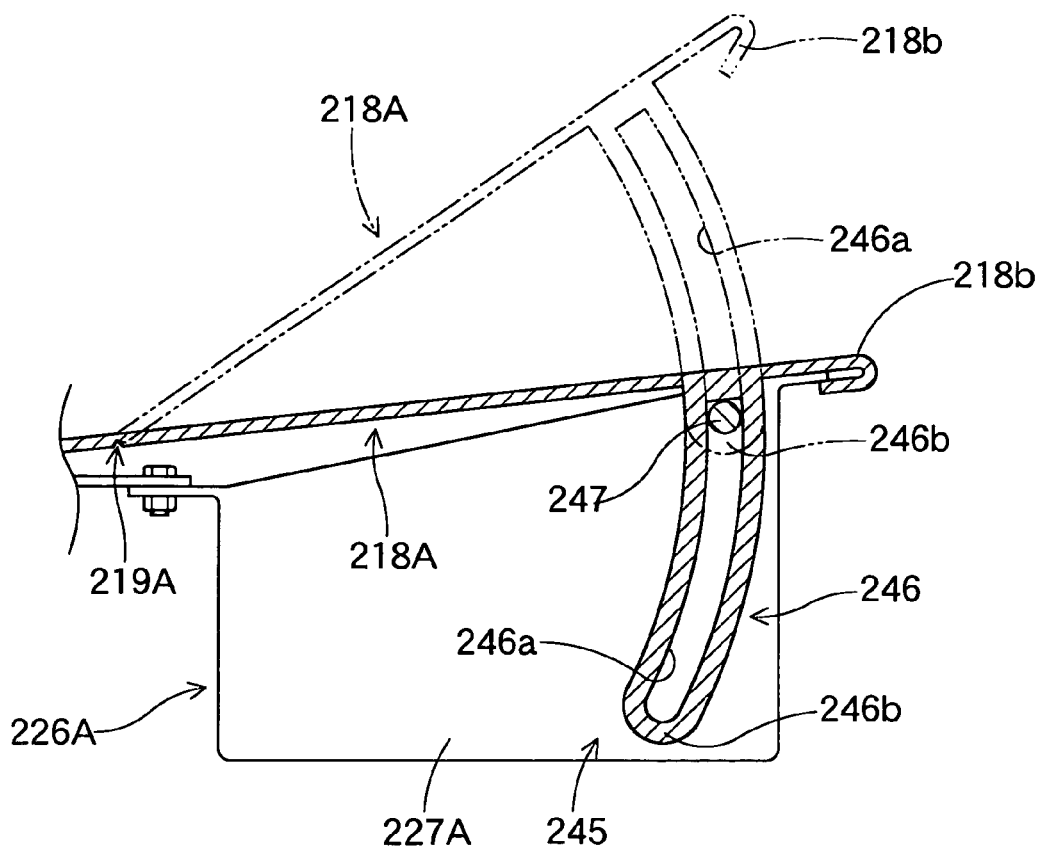
FIG. 32 is a schematic cross-sectional view of the portion taken along the XXXII-XXXII in FIG. 31.

In the eighth embodiment, the flap portion 218 is formed substantially into a trapezoidal shape, and the opening angle of the center portion 218*c* is controlled by the both left and right portions 218*d*, 218*e*. However, the flap portion may be a flap portion 218A of a pedestrian airbag system M9 according to a ninth embodiment shown in FIGS. 30 to 32. The flap portion 218A is provided with a hinge portion 219A disposed substantially over the entire length in the lateral direction in the hood panel 213A so as to extend along the rear edge 213*a* of the hood panel 213A. The flap portion 218A includes stoppers 245 which control the opening angle. The stoppers 245 are disposed on both left and right sides of the case 226A and each includes a guide strip 246 and an engaging shank 247. The guide strip 246 is disposed so as to project downward from the flap portion 218A. The engaging shank 247 projects from a side wall portion 227A of a case 226A toward the guide strip 246. The guide strip 246 is formed with a groove 246*a*, and the groove 246*a* is formed into an arcuate shape with the hinge portion 219A as the center of the arc, and the engaging shank 247 is inserted into the groove 246*a*. The engaging shank 247 is substantially in a cylindrical shape which can slide in the groove 246*a*. When the flap portion 218A of this structure is used, the hinge portion 219A is plastically deformed so that the flap portion 218A is pushed upward by the airbag 240 and is opened with the rear edge 218*b* side moved upward when the airbag 240 is deployed and inflated. In this case, a portion 246*b* at the distal end of the groove 246*a* of the guide strip 246 comes into abutment with the engaging shank 247 so that the upward movement of the flap portion 218A is limited. Therefore, the rear edge 218*b* of the opened flap portion 218A does not move so as to face the front. Consequently, the flap portion 218A can protect the pedestrian from the rear edge 218*b* of the flap portion 218A.

Furthermore, in the pedestrian airbag system M8 of the eighth embodiment, the hinge portion 219 which serves as the center of rotation when opening the flap portion 218 is disposed at the position forwardly of the opening 226*a* of the case 226. Therefore, the distance from the hinge portion 219 to the rear edge 218*b* of the flap portion is larger than the case of the flap portion in which the hinge portion is disposed near the front edge of the case opening. Consequently, even when the opening angle of the flap portion 218 is small, the sufficient opening H1 between the rear edge 218*b* and the case 226 can be secured. In other words, the flap portion 218 can minimize the opening angle and the pedestrian can protected reliably from the rear edge 218 of the opened flap portion 218. When these points are not important, the hinge portion may be disposed near the front edge of the case opening, or, alternatively, the hinge portion can be disposed rearwardly of the front edge of the case opening.

In the pedestrian airbag system M8 of the eighth embodiment, the entire hood panel 213 is formed of aluminum (aluminum alloy). Since aluminum is softer than metal material such as steel, in the pedestrian airbag system M8 according to the eighth embodiment, the hinge portion 219 is subjected to deformation, and hence the flap portion 218 opens easily when the airbag 240 is deployed and inflated. When these points are not important, the hood panel formed of steel plate can be used.

Figure 33:
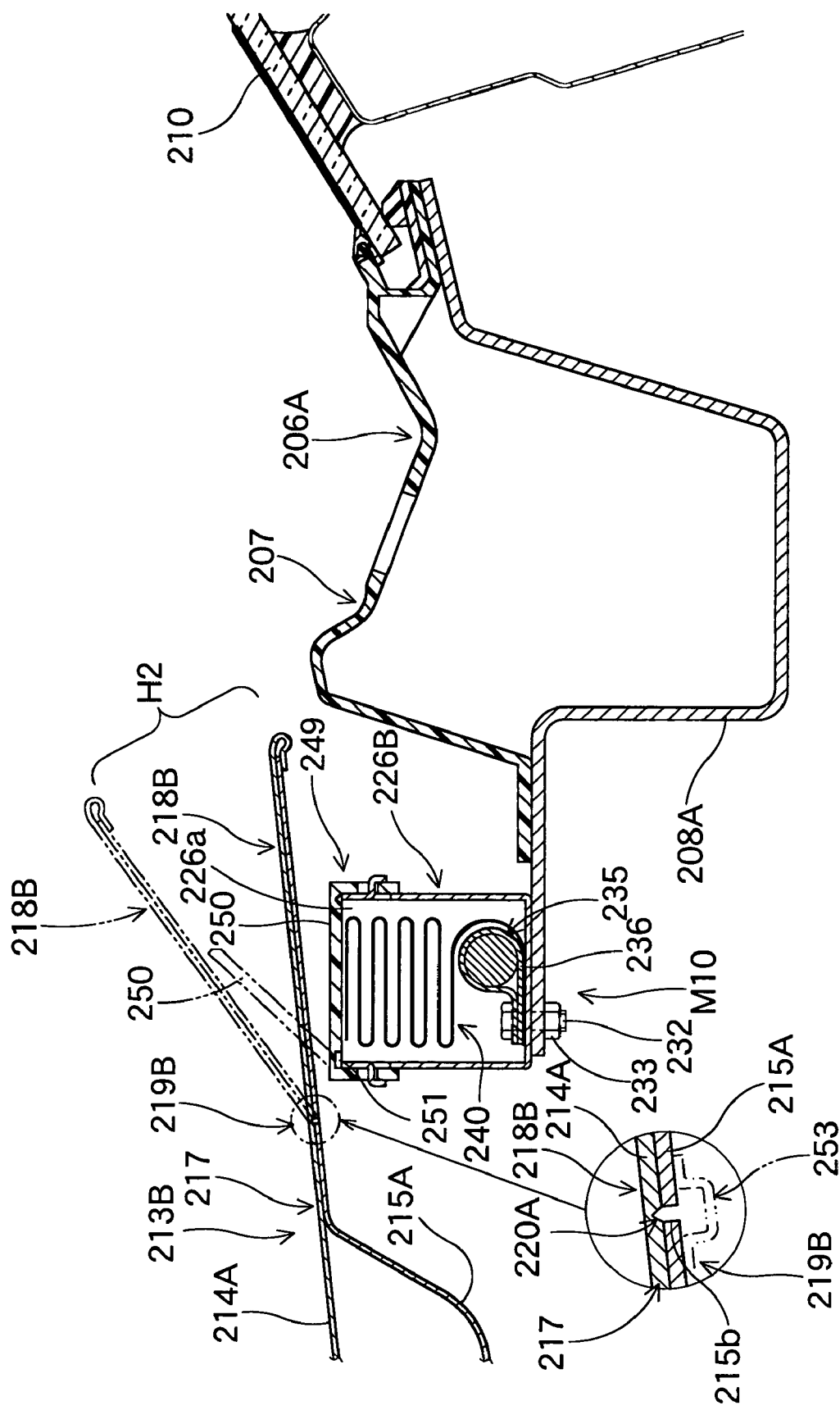
FIG. 33 is a schematic cross-sectional view of a pedestrian airbag system according to a tenth embodiment.

Alternatively, as a pedestrian airbag system M10 according to a tenth embodiment shown in FIG. 33, a case 226B may be fixed to the cowl panel 208A which comprises a cowl 206A. The case 226B is fixed by utilizing bolts 232 for fixing the inflators 235 to the case 226B. In the pedestrian airbag system M10 shown in FIG. 33, a case cover 249 formed of synthetic resin such as olefin thermoplastic elastomer is disposed so as to cover the opening 226*a* on the upper side of the case 226B. The case cover 249 is disposed for preventing water or foreign substances from entering the case 226B. The case cover 249 is provided with a lid portion 250 which covers the opening 226*a* of the case 226B and opens when the airbag 240 is deployed and inflated. The lid portion 250 includes a hinge portion 251 disposed at the front side, and is adapted to open at the rear side with the hinge portion 251 as the center of rotation. In the pedestrian airbag system M10, the flap portion 218B includes an outer panel 214A and an inner panel 215A. A slit 215*b* continuous with the recess groove 220A is formed at a position of the inner panel 215A where the hinge portion 219B is disposed.

In the pedestrian airbag system M10 configured as described above, when the operation signal is supplied to the inflators 235, inflation gas is injected from the inflators 235. Therefore, the airbag 240 allows inflation gas to flow therein and is inflated so as to push and open the lid portion 250 of the case cover 249. Subsequently, the airbag 240 projecting from the opening 226*a* of the case 226B pushes the flap portion 218B, and the flap portion 218B opens so that the rear edge 218*b* side is moved upward while plastically deforming the hinge portion 219B. Then, the airbag 240 projects rearward and upward from an opened opening H2 so that inflation is completed.

In the pedestrian airbag system M10 of the above described structure, the case 226B is not fixed to the side of the hood panel 213B, and is fixed to the side of the cowl panel 208A. The case 226B increases in weight by accommodating the airbag 240, the inflators 235 for supplying inflation gas to the airbag 240. The pedestrian airbag system M10 is mounted on the vehicle, and so it is not necessary to fix the hood panel 213 to which the case 226 is fixed to the body 201 of the vehicle V as in the case of the pedestrian airbag system M8. Therefore, the weight of the hood panel 213B during mounting operation to the vehicle may be reduced in comparison with the hood panel 213 of the pedestrian airbag system M8 described above. Consequently, in the tenth embodiment, mounting operation of the hood panel 213B to the vehicle body side is facilitated. Fixing operation of the case 226B to the cowl panel 208A may be performed before the mounting operation of the hood panel 213B to the vehicle body side or after mounting and fixing the hood panel 213B to the vehicle body side.

In the pedestrian airbag system M8, M9, M10 in the respective embodiments, there are provided the hinge portions 219, 219A, 219B cut out in the recess groove shape, which serve as the center of rotation when the flap portions 218, 218A, 218B open. However, the shape of the hinge portion is not limited thereto. For example, since the portion of the single outer panel near the joint (welding) portion between the inner panel and the outer panel of the hood panel is subject to concentration of stress, the portion of the outer panel near the rear edge of the joint portion may be configured as the hinge portion. Alternatively, when the recess grooves 220, 220A are provided as the hinge portions 219, 219A, 219B as in the respective embodiments, one or more band-shaped joint members 253 may be provided on the lower side of the recess groove 220A as shown by a chain double-dashed line in FIG. 33. The joint member 253 is connected at both ends in the longitudinal direction to the main panel 217 and to the flap portion 218B so as to be capable of preventing the portion at the recess groove 220A from breaking.

What is claimed is:

1. A pedestrian airbag system to be mounted to a hood panel of a vehicle formed of sheet metal, comprising:
    an airbag which inflates so as to cover at least a cowl near a rear edge of the hood panel by being supplied with inflation gas;
    an outer panel being formed of sheet metal and constituting the upper surface side of the hood panel, and comprising an opening to allow the airbag being inflated to project therethrough;
    an inner panel formed of sheet metal and constituting a lower surface side of the hood panel, the inner panel having a higher strength than the outer panel, the inner panel and the outer panel together constituting the hood panel;
    a flap portion disposed on the outer panel to cover the opening, configured so as open when pressed by the airbag at the time of inflation and formed from a plate of the same sheet metal material as the outer panel which is disposed around the opening, the flap portion comprising a separation line where the flap portion can be separated from the outer panel and a hinge portion which serves as a center of rotation when the flap portion is opened, the separation line and the hinge portion being disposed at the boundary with the outer panel;
    a coating film coating the outer surfaces of the outer panel and the flap portion continuously;
    a case disposed below the flap portion for accommodating the folded airbag, the case including an open top and a fixing strip disposed along a periphery of the open top, wherein
    the inner panel includes a placement hole penetrating through the inner panel in the vertical direction and a mounting seat disposed on a periphery of the placement hole, the fixing strip of the case being secured to the mounting seat, the mounting seat being configured slightly larger than an outer contour of the flap portion,
    the inner panel is secured to a portion on the outer panel near the separation line of the flap portion,
    the case is connected to the portion of the outer panel near the separation line by the fastening of the fixing strip to the mounting seat of the inner panel coupled with the fixation of the inner panel to the portion on the outer panel near the separation line, and
    wherein the case for accommodating the folded airbag is disposed on the lower surface side of the flap portion, and the case and the portion of the outer panel near the separation line are connected to each other.

2. The pedestrian airbag system according to claim 1, wherein the flap portion is formed separately from the outer panel surrounding the opening.

3. The pedestrian airbag system according to claim 2, wherein a supporting strip capable of supporting an outer edge of the flap portion is disposed on a lower side of the separation line.

4. The pedestrian airbag system according to claim 1, wherein the separation line around the flap portion is provided with a thinned portion continuously or discontinuously and is connected to the outer panel so that the separation line around the flap portion is broken and separated from the outer panel around the opening when pushed by the airbag.

* * * * *